(12) United States Patent
Hara et al.

(10) Patent No.: US 11,548,560 B2
(45) Date of Patent: Jan. 10, 2023

(54) VEHICLE SKELETON STRUCTURE

(71) Applicant: TOYOTA JIDOSHA KABUSHIKI KAISHA, Aichi-ken (JP)

(72) Inventors: Yasuhiro Hara, Nagoya (JP); Jumpei Watanabe, Nagakute (JP); Hirotaka Ishioka, Toyota (JP); Norimasa Koreishi, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/216,687

(22) Filed: Mar. 30, 2021

(65) Prior Publication Data

US 2021/0309299 A1  Oct. 7, 2021

(30) Foreign Application Priority Data

Apr. 2, 2020 (JP) .............................. JP2020-067080

(51) Int. Cl.
| | |
|---|---|
| *B62D 25/04* | (2006.01) |
| *B60J 1/10* | (2006.01) |
| *B60J 5/04* | (2006.01) |
| *B62D 21/03* | (2006.01) |
| *B62D 25/06* | (2006.01) |

(52) U.S. Cl.
CPC ............. *B62D 25/04* (2013.01); *B60J 1/10* (2013.01); *B60J 5/0479* (2013.01); *B62D 21/03* (2013.01); *B62D 25/06* (2013.01)

(58) Field of Classification Search
CPC ........ B62D 25/06; B62D 25/04; B62D 31/02; B60K 1/04; B60K 2001/0438; B60J 5/042; B60J 5/062; B60J 5/0423; B60J 5/0426; B60J 5/0433; B60J 5/06; B60J 5/0479

USPC ........ 296/203.01–203.4, 193.06, 146.6, 155, 296/205
See application file for complete search history.

(56) References Cited

U.S. PATENT DOCUMENTS

| 3,605,338 A | 9/1971 | Grossbach | |
|---|---|---|---|
| 4,544,198 A * | 10/1985 | Ochiai | B60J 5/06 296/155 |

(Continued)

FOREIGN PATENT DOCUMENTS

| DE | 19903724 A1 | 8/2000 |
|---|---|---|
| EP | 1256509 * | 1/2007 |

(Continued)

OTHER PUBLICATIONS

Unpublished U.S. Appl. No. 17/086,457, filed Nov. 2, 2020, 28pp.

*Primary Examiner* — Dennis H Pedder
(74) *Attorney, Agent, or Firm* — Hauptman Ham, LLP

(57) ABSTRACT

A vehicle skeleton structure includes: a first front pillar portion provided at a first side portion of a vehicle body; a second front pillar portion provided at a second side portion of the vehicle body; a front upper cross portion coupled to upper portions of the first and second front pillar portions; a front lower cross portion coupled to lower portions of the first and second front pillar portions; a first rear pillar portion provided at the first side portion along a rear peripheral edge portion of the door opening portion; a second rear pillar portion provided at the second side portion; a rear upper cross portion coupled to upper portions of the first and second rear pillar portions; and a rear lower cross portion coupled to lower portions of the first and second rear pillar portions.

13 Claims, 10 Drawing Sheets

(56) References Cited

U.S. PATENT DOCUMENTS

| | | | |
|---|---|---|---|
| 5,094,313 A * | 3/1992 | Mauws | B62D 61/08 |
| | | | 180/908 |
| 5,577,793 A | 11/1996 | Kobasic | |
| 6,139,094 A * | 10/2000 | Teply | B62D 29/008 |
| | | | 296/29 |
| 6,694,676 B2 * | 2/2004 | Sakamoto | B60J 5/0479 |
| | | | 292/216 |
| 8,002,064 B2 * | 8/2011 | Yamada | B62D 21/09 |
| | | | 180/311 |
| 10,960,739 B2 * | 3/2021 | Choi | B60J 5/043 |
| 11,065,990 B2 * | 7/2021 | Sakai | B60N 2/015 |
| 2002/0033299 A1 | 3/2002 | Thomas | |
| 2017/0305253 A1 | 10/2017 | Perlo et al. | |
| 2018/0178636 A1 | 6/2018 | Ajisaka | |
| 2020/0276913 A1 | 9/2020 | Takahashi | |

FOREIGN PATENT DOCUMENTS

| | | | | |
|---|---|---|---|---|
| EP | 2783951 A1 * | 10/2014 | ........... | B62D 21/157 |
| JP | S6139671 U | 3/1986 | | |
| JP | H315424 Y2 | 4/1991 | | |
| JP | H4112175 U | 9/1992 | | |
| JP | H4310478 A | 11/1992 | | |
| JP | H549573 U | 6/1993 | | |
| JP | 2003226136 A | 8/2003 | | |
| JP | 3765274 B2 * | 4/2006 | | |
| JP | 2016222087 A | 12/2016 | | |
| JP | 201981436 A | 5/2019 | | |
| JP | 2019119261 A | 7/2019 | | |
| JP | 3795109 B1 | 12/2020 | | |
| WO | 0238434 A2 | 5/2002 | | |
| WO | 2016174570 A1 | 11/2016 | | |
| WO | 2018076662 A1 | 5/2018 | | |
| WO | 2019098382 A1 | 5/2019 | | |

* cited by examiner

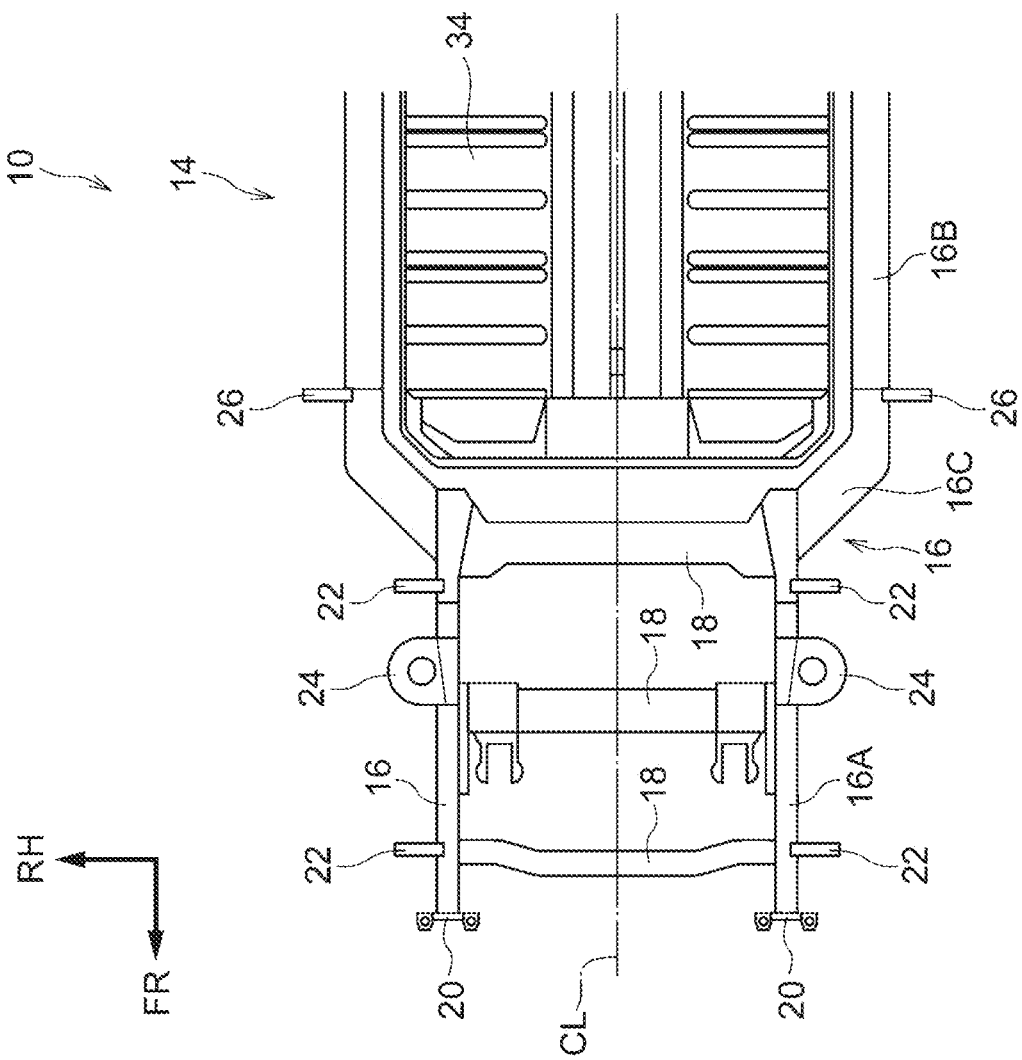

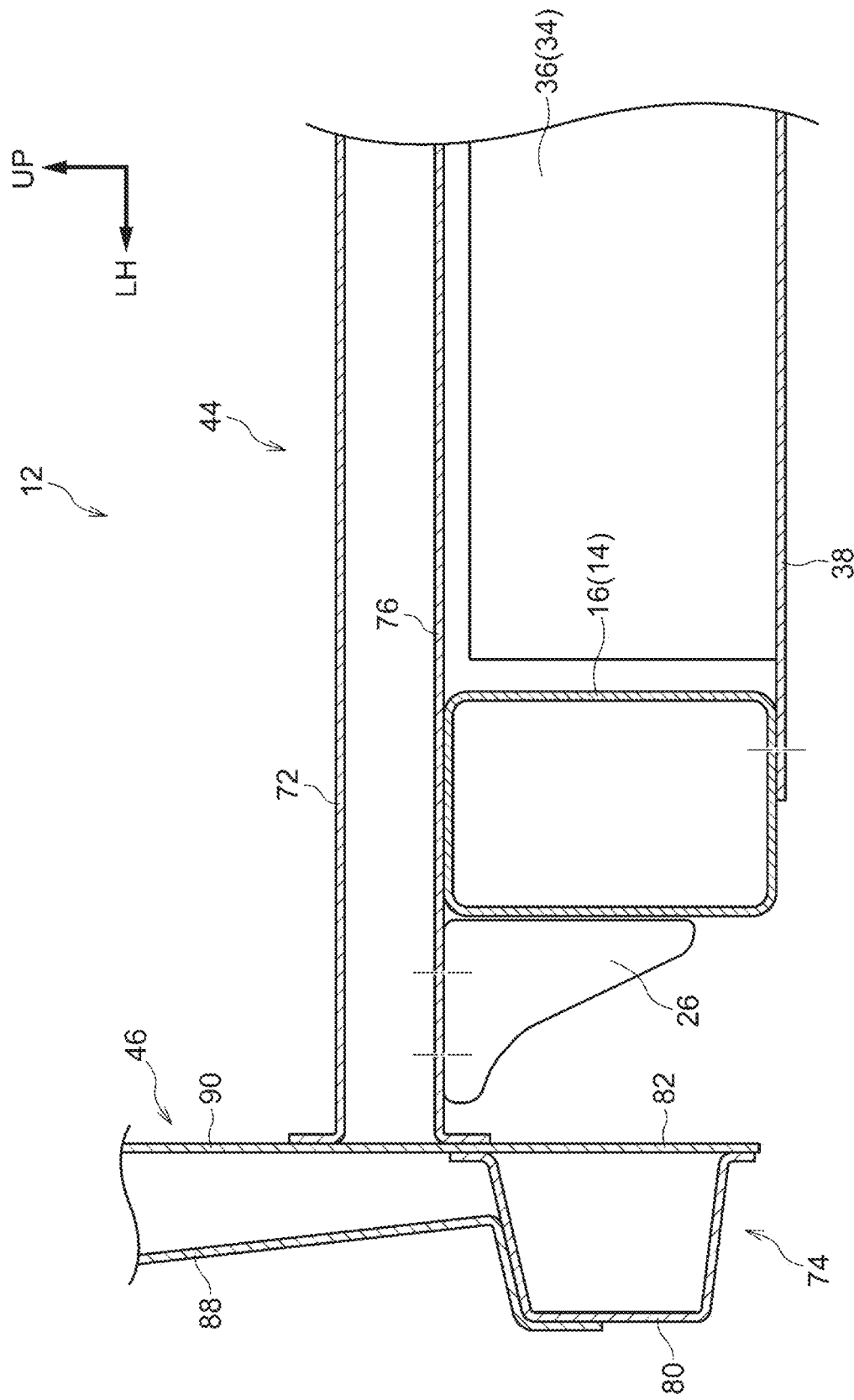

VEHICLE SKELETON STRUCTURE

CROSS-REFERENCE TO RELATED APPLICATION

This application claims priority to Japanese Patent Application No. 2020-067080 filed on Apr. 2, 2020, incorporated herein by reference in its entirety.

BACKGROUND

1. Technical Field

The present disclosure relates to a vehicle skeleton structure.

2. Description of Related Art

Japanese Unexamined Patent Application Publication No. 2019-119261 (JP 2019-119261 A) discloses an disclosure related to a slide door structure of a vehicle. In the slide door structure of a vehicle, a slide door is disposed on the rear side, in the vehicle front-rear direction, of a front side door, and coupled not via a center pillar. Therefore, a large door opening portion can be secured at a side portion of the vehicle.

SUMMARY

In the disclosure described above, however, a center pillar is not provided at the side portion of the vehicle body, and therefore there remains room for improvement in terms of securing the rigidity of the vehicle body against a load in the vehicle width direction input to the vehicle. That is, the disclosure described above leaves room for improvement in terms of securing the rigidity of the vehicle body against a load in the vehicle width direction input to the vehicle while securing a large door opening portion at a side portion of the vehicle.

The present disclosure provides a vehicle skeleton structure that can secure the rigidity of the vehicle body against a load in the vehicle width direction input to the vehicle while securing a large door opening portion at a side portion of the vehicle.

The vehicle skeleton structure according to a first aspect of the present disclosure includes: a first front pillar portion provided at a first side portion, on a first side in a vehicle width direction, of a vehicle body, the first front pillar portion being disposed along a peripheral edge portion, on a front side in a vehicle front-rear direction, of a door opening portion to be opened and closed by a side door, the first front pillar portion extending in a vehicle up-down direction; a second front pillar portion that is provided at a second side portion, on a second side in the vehicle width direction, of the vehicle body and that extends in the vehicle up-down direction; a front upper cross portion that extends in the vehicle width direction and that is coupled to an upper portion of the first front pillar portion and an upper portion of the second front pillar portion, either directly or via a member; a front lower cross portion that extends in the vehicle width direction and that is coupled to a lower portion of the first front pillar portion and a lower portion of the second front pillar portion, either directly or via a member; a first rear pillar portion provided at the first side portion and disposed along a peripheral edge portion, on a rear side in the vehicle front-rear direction, of the door opening portion, the first rear pillar portion extending in the vehicle up-down direction; a second rear pillar portion that is provided at the second side portion and that extends in the vehicle up-down direction; a rear upper cross portion that extends in the vehicle width direction and that is coupled to an upper portion of the first rear pillar portion and an upper portion of the second rear pillar portion, either directly or via a member; and a rear lower cross portion that extends in the vehicle width direction and that is coupled to a lower portion of the first rear pillar portion and a lower portion of the second rear pillar portion, either directly or via a member.

With the aspect described above, a load in the vehicle width direction input to the vicinity of the door opening portion of the vehicle body can be distributed over a wide range of the vehicle body, and deformation of the vehicle body due to the load can be suppressed. That is, it is possible to secure the rigidity of the vehicle body against a load in the vehicle width direction input to the vehicle while securing a large door opening portion at a side portion of the vehicle.

In the aspect described above, the front upper cross portion and the rear upper cross portion may each constitute a closed sectional structure together with a roof panel that constitutes a portion of the vehicle body on an upper side in the vehicle up-down direction.

With the configuration described above, each of the front upper cross portion and the rear upper cross portion constitutes a closed sectional structure together with the roof panel which constitutes a portion of the vehicle body on the upper side in the vehicle up-down direction, and the roof panel is reinforced by the closed sectional structure. That is, it is possible to secure the rigidity of a portion of the vehicle body on the upper side in the vehicle up-down direction against a load in the vehicle width direction input to the vehicle.

In the aspect described above, the front lower cross portion and the rear lower cross portion may each constitute a closed sectional structure together with a floor panel that constitutes a portion of the vehicle body on a lower side in the vehicle up-down direction.

With the configuration described above, each of the front lower cross portion and the rear lower cross portion constitutes a closed sectional structure together with the floor panel which constitutes a portion of the vehicle body on the lower side in the vehicle up-down direction, and the floor panel is reinforced by the closed sectional structure. That is, it is possible to secure the rigidity of a portion of the vehicle body on the lower side in the vehicle up-down direction against a load in the vehicle width direction input to the vehicle.

In the aspect described above, a front side door as the side door may be disposed on a side of the first front pillar portion, and a rear side door as the side door may be disposed on a side of the first rear pillar portion, at the first side portion.

With the configuration described above, the front side door is disposed on the side of the first front pillar portion, and the rear side door is disposed on the side of the first rear pillar portion, at the first side portion. Therefore, it is possible to suppress an increase in the size of the side doors, even if an increase in the size of the door opening portion is attempted, compared to a configuration in which the door opening portion which is provided at the first side portion is opened and closed by a single side door. That is, it is possible to suppress an increase in the space required to open and close the side doors that accompanies an increase in the size of the door opening portion which is provided in the vehicle.

In the aspect described above, the vehicle skeleton structure may further include: a side door reinforcement portion that is disposed in the side door and that extends in the vehicle front-rear direction, a part of a front portion of the side door reinforcement portion being coupled to the first front pillar portion, either directly or via a member, and a part of a rear portion of the side door reinforcement portion being coupled to the first rear pillar portion, either directly or via a member, in a closed state in which the door opening portion is closed by the side door, and the rear portion of the side door reinforcement portion being located rearward of the front portion of the side door reinforcement portion in the vehicle front-rear direction; a first front reinforcement portion that extends in the vehicle front-rear direction at the first side portion on a front side of the first front pillar portion in the vehicle front-rear direction, the first front reinforcement portion being connected to the first front pillar portion on a rear side in the vehicle front-rear direction and connected to a front skeleton portion of a front portion of the vehicle body on a front side in the vehicle front-rear direction, and at least a part of the first front reinforcement portion being disposed between a first line that extends in the vehicle front-rear direction and that passes through an upper edge portion of the side door reinforcement portion and a second line that extends in the vehicle front-rear direction and that passes through a lower edge portion of the side door reinforcement portion, as seen in the vehicle width direction; and a first rear reinforcement portion that extends in the vehicle front-rear direction at the first side portion on a rear side of the first rear pillar portion in the vehicle front-rear direction, the first rear reinforcement portion being connected to the first rear pillar portion on a front side in the vehicle front-rear direction and connected to a rear skeleton portion of a rear portion of the vehicle body on a rear side in the vehicle front-rear direction, and at least a part of the first rear reinforcement portion being disposed between the first line and the second line as seen in the vehicle width direction.

With the configuration described above, the side door reinforcement portion which extends in the vehicle front-rear direction is disposed in the side doors, and the side doors are reinforced by the side door reinforcement portion. In addition, in the closed state in which the door opening portion is closed by the side doors, a part of a front portion of the side door reinforcement portion is coupled to the first front pillar portion, either directly or via a member, and a part of a rear portion of the side door reinforcement portion is coupled to the first rear pillar portion, either directly or via a member. The rear portion of the side door reinforcement portion is located rearward of the front portion of the side door reinforcement portion in the vehicle front-rear direction. Therefore, a load in the vehicle width direction input to the side doors is transferred to the first front pillar portion and the first rear reinforcement portion via the side door reinforcement portion.

In addition, the first front reinforcement portion which extends in the vehicle front-rear direction is disposed at the first side portion of the vehicle body on the front side, in the vehicle front-rear direction, of the first front pillar portion. The first front reinforcement portion is connected to the first front pillar portion on the rear side in the vehicle front-rear direction, and connected to the front skeleton portion of the front portion of the vehicle body on the front side in the vehicle front-rear direction.

On the other hand, the first rear reinforcement portion which extends in the vehicle front-rear direction is disposed at the first side portion on the rear side, in the vehicle front-rear direction, of the first rear pillar portion. The first rear reinforcement portion is connected to the first rear pillar portion on the front side in the vehicle front-rear direction, and connected to the rear skeleton portion of the rear portion of the vehicle body on the rear side in the vehicle front-rear direction.

Therefore, a load transferred from the side of the side doors to the first front pillar portion and the first rear pillar portion can also be distributed to the front portion and the rear portion of the vehicle body via the first front reinforcement portion and the first rear reinforcement portion.

With the configuration described above, in addition, at least a part of the first front reinforcement portion and the first rear reinforcement portion is accommodated between the first line, which extends in the vehicle front-rear direction and passes through the upper edge portion of the side door reinforcement portion, and the second line, which extends in the vehicle front-rear direction and passes through the lower edge portion of the side door reinforcement portion, as seen in the vehicle width direction. Therefore, it is possible to suppress generation of a bending moment in the vehicle up-down direction due to a load transferred from the side of the side door reinforcement portion to the first front reinforcement portion and the first rear reinforcement portion, and secure the efficiency of transfer of the load to the front portion and the rear portion of the vehicle body. That is, a load in the vehicle width direction input to the vehicle can be distributed over the entire vehicle body.

In the aspect described above, the front side door may be provided with a front door reinforcement portion that constitutes a portion on a front side of the side door reinforcement portion in the vehicle front-rear direction. The rear side door may be provided with a rear door reinforcement portion that constitutes a portion on a rear side of the side door reinforcement portion in the vehicle front-rear direction. A rear end portion of the front side door and a front end portion of the rear side door may be coupled to each other via a lock device in a state of overlapping each other as seen in the vehicle width direction in the closed state.

With the configuration described above, the front side door is reinforced by the front door reinforcement portion which extends in the vehicle front-rear direction, and the rear side door is reinforced by the rear door reinforcement portion which extends in the vehicle front-rear direction.

In the case where a load in the vehicle width direction is input to the side of the first side portion of the vehicle, it is considered that the load may affect the inside of the cabin of the vehicle if the load cannot be supported by the front door reinforcement portion and the rear door reinforcement portion.

In the closed state in which the door opening portion is closed by the front side door and the rear side door, the rear end portion of the front side door and the front end portion of the rear side door are coupled to each other via the lock device in the state of overlapping each other as seen in the vehicle width direction. Therefore, a load in the vehicle width direction input to at least one of the front side door and the rear side door can be supported by the front door reinforcement portion and the rear door reinforcement portion, and hence can be supported by the first front pillar portion and the first rear pillar portion. That is, it is possible to suppress the effect of a load in the vehicle width direction input to the vehicle on the inside of the cabin.

In the aspect described above, the front side door and the rear side door may be slidable in the vehicle front-rear direction, the first front reinforcement portion may be provided with a front rail portion that guides the front side door, and the first rear reinforcement portion may be provided with a rear rail portion that guides the rear side door.

With the configuration described above, the front side door and the rear side door are slidable in the vehicle front-rear direction. The front rail portion which guides the front side door is provided on the first front reinforcement portion, and the rear rail portion which guides the rear side door is provided on the first rear reinforcement portion.

Therefore, the first front reinforcement portion can reinforce a portion of the first side portion on the front side in the vehicle front-rear direction, and can support the front side door which has been moved to the front side in the vehicle front-rear direction. In addition, the first rear reinforcement portion can reinforce a portion of the first side portion on the rear side in the vehicle front-rear direction, and can support the rear side door which has been moved to the rear side in the vehicle front-rear direction. That is, the configuration of the vehicle body can be simplified by achieving commonality between the reinforcement members of the vehicle body and the support members for the side doors.

In the aspect described above, the vehicle skeleton structure may further include: a side reinforcement portion that is provided at the second side portion and that extends in the vehicle front-rear direction, a part of a front portion of the side reinforcement portion being coupled to the second front pillar portion, either directly or via a member, and a part of a rear portion of the side reinforcement portion being coupled to the second rear pillar portion, either directly or via a member, and the rear portion of the side reinforcement portion being located rearward of the front portion of the side reinforcement portion in the vehicle front-rear direction; a second front reinforcement portion that extends in the vehicle front-rear direction at the second side portion on a front side of the second front pillar portion in the vehicle front-rear direction, the second front reinforcement portion being connected to the second front pillar portion on a rear side in the vehicle front-rear direction and connected to the front skeleton portion on a front side in the vehicle front-rear direction; and a second rear reinforcement portion that extends in the vehicle front-rear direction at the second side portion on a rear side of the second rear pillar portion in the vehicle front-rear direction, the second rear reinforcement portion being connected to the second rear pillar portion on a front side in the vehicle front-rear direction and connected to the rear skeleton portion on a rear side in the vehicle front-rear direction.

With the configuration described above, the side reinforcement portion which extends in the vehicle front-rear direction is provided at the second side portion of the vehicle body. A part of a front portion of the side reinforcement portion is coupled to the second front pillar portion, either directly or via a member. A part of a rear portion of the side reinforcement portion is coupled to the second rear pillar portion, either directly or via a member. The rear portion of the side reinforcement portion is located rearward of the front portion of the side reinforcement portion in the vehicle front-rear direction.

In addition, the second front reinforcement portion which extends in the vehicle front-rear direction is disposed at the second side portion on the front side, in the vehicle front-rear direction, of the second front pillar portion. The second front reinforcement portion is connected to the second front pillar portion on the rear side in the vehicle front-rear direction, and connected to the front skeleton portion of the vehicle body on the front side in the vehicle front-rear direction.

On the other hand, the second rear reinforcement portion which extends in the vehicle front-rear direction is disposed at the second side portion on the rear side, in the vehicle front-rear direction, of the second rear pillar portion. The second rear reinforcement portion is connected to the second rear pillar portion on the front side in the vehicle front-rear direction, and connected to the rear skeleton portion of the vehicle body on the rear side in the vehicle front-rear direction.

Therefore, in the closed state in which the door opening portion is closed by the side doors, an all-around annular structure portion is constructed in the vehicle, the all-around annular structure portion including the side door reinforcement portion, the first front reinforcement portion, the first rear reinforcement portion, the front skeleton portion, the rear skeleton portion, the side reinforcement portion, the second front reinforcement portion, and the second rear reinforcement portion and being formed annularly as seen in the vehicle up-down direction.

As a result, a load in the vehicle width direction input to the vicinity of the door opening portion of the vehicle body can be distributed over a wide range of the vehicle body via the all-around annular structure portion, and deformation of the vehicle body due to the load can be suppressed. That is, it is possible to enhance the rigidity of the vehicle body against a load in the vehicle width direction input to the vehicle.

In the aspect described above, a window opening portion may be provided on an upper side, in the vehicle up-down direction, of at least one of the first front reinforcement portion and the first rear reinforcement portion.

With the configuration described above, the window opening portion is provided on the upper side, in the vehicle up-down direction, of at least one of the first front reinforcement portion and the first rear reinforcement portion at the first side portion of the vehicle body, and the lower edge portion of the window opening portion can be reinforced by the one of the first front reinforcement portion and the first rear reinforcement portion. That is, it is possible to secure the rigidity around the window portion of the vehicle body against a load in the vehicle width direction input to the vehicle.

In the aspect described above, the vehicle skeleton structure may further include: a frame that includes a pair of side frame portions and a plurality of mount portions, the side frame portions being disposed on a lower side, in the vehicle up-down direction, of the vehicle body and disposed away from each other in the vehicle width direction, and the side frame portions extending in the vehicle front-rear direction, and the mount portions being provided on the side frame portions and disposed in line in the vehicle width direction, and the mount portions supporting the front lower cross portion or the rear lower cross portion from the lower side in the vehicle up-down direction; and a cover panel portion that covers, from the lower side in the vehicle up-down direction, a power supply portion disposed between the side frame portions and that extends between the side frame portions.

With the configuration described above, the frame which includes the pair of side frame portions and the plurality of mount portions which are provided on the side frame portions is disposed on the lower side of the vehicle body. The side frame portions are disposed away from each other in the vehicle width direction, and extend in the vehicle front-rear direction. The power supply portion is disposed between the side frame portions. Therefore, with the present disclosure, power can be supplied to the various devices of the vehicle while securing a space in the vehicle body.

In addition, the power supply portion is covered by the cover panel portion, which extends between the side frame portions, from the lower side in the vehicle up-down direction, and the power supply portion can be protected by the cover panel portion against input from the side of the road surface.

On the other hand, the mount portions are disposed in line in the vehicle width direction, and support the front lower cross portion or the rear lower cross portion from the lower side in the vehicle up-down direction. Therefore, a rahmen structure including the front lower cross portion or the rear lower cross portion which is supported by the mount portions, the mount portions, the side frame portion, and the cover panel portion is constituted. As a result, the lower portion of the vehicle can be made unlikely to be deformed upon a load in the vehicle width direction input to the vehicle. That is, it is possible to stably supply power to in-vehicle devices while securing a space in the cabin, and secure the rigidity of the lower portion of the vehicle against a load in the vehicle width direction input to the vehicle.

In the aspect described above, the first front pillar portion, the second front pillar portion, the front upper cross portion, and the front lower cross portion may constitute a front annular structure portion configured annularly as seen in the vehicle front-rear direction. The first rear pillar portion, the second rear pillar portion, the rear upper cross portion, and the rear lower cross portion may constitute a rear annular structure portion configured annularly as seen in the vehicle front-rear direction.

In the aspect described above, the upper portion of the first front pillar portion and the lower portion of the first front pillar portion may overlap each other as seen in the vehicle up-down direction. The upper portion of the second front pillar portion and the lower portion of the second front pillar portion may overlap each other as seen in the vehicle up-down direction. The upper portion of the first rear pillar portion and the lower portion of the first rear pillar portion may overlap each other as seen in the vehicle up-down direction. The upper portion of the second rear pillar portion and the lower portion of the second rear pillar portion may overlap each other as seen in the vehicle up-down direction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a plan view schematically illustrating the configuration of a frame of the vehicle to which the vehicle skeleton structure according to the present embodiment is applied; and FIG. 10 is a sectional view schematically illustrating the configuration of a boundary portion between the vehicle body and the frame of the vehicle to which the vehicle skeleton structure according to the present embodiment is applied as seen in the vehicle front-rear direction (a sectional view illustrating a state taken along the X-X line in FIG. 2).

DETAILED DESCRIPTION OF EMBODIMENTS

Figure 1:
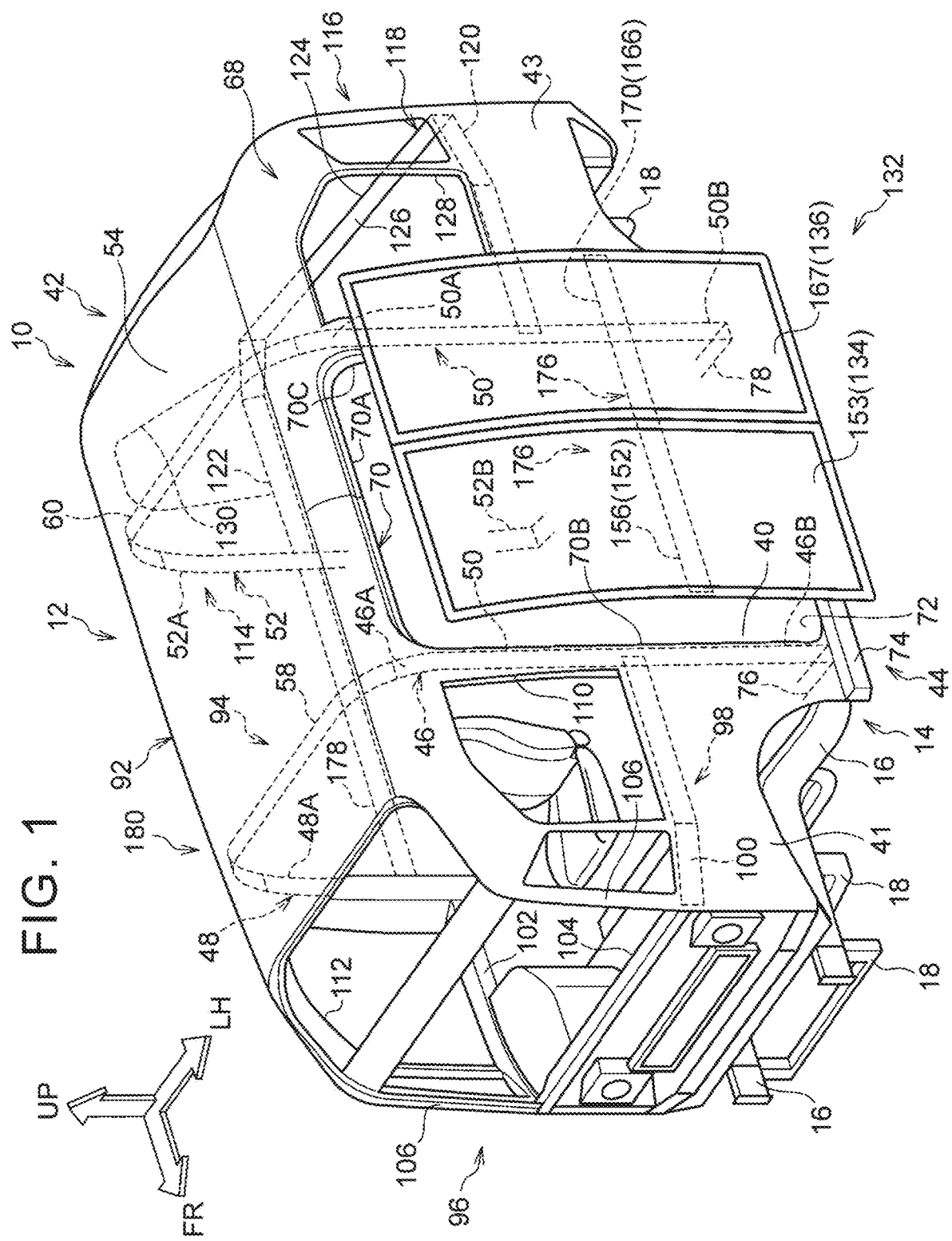
FIG. 1 is a perspective view schematically illustrating the configuration of a vehicle to which a vehicle skeleton structure according to the present embodiment is applied.

A vehicle skeleton structure according to an exemplary embodiment of the present disclosure will be described below with reference to FIGS. 1 to 10. An arrow FR occasionally indicated in the drawings indicates the front side in the vehicle front-rear direction, an arrow UP indicates the upper side in the vehicle up-down direction, and an arrow LH indicates the left side in the vehicle width direction.

As illustrated in FIG. 1, a vehicle 10 to which the vehicle skeleton structure according to the present embodiment is applied includes a vehicle body 12 and a frame 14 that supports the vehicle body 12, and has a so-called frame structure. The vehicle body 12 and the frame 14 are made of steel, by way of example.

Figure 2:
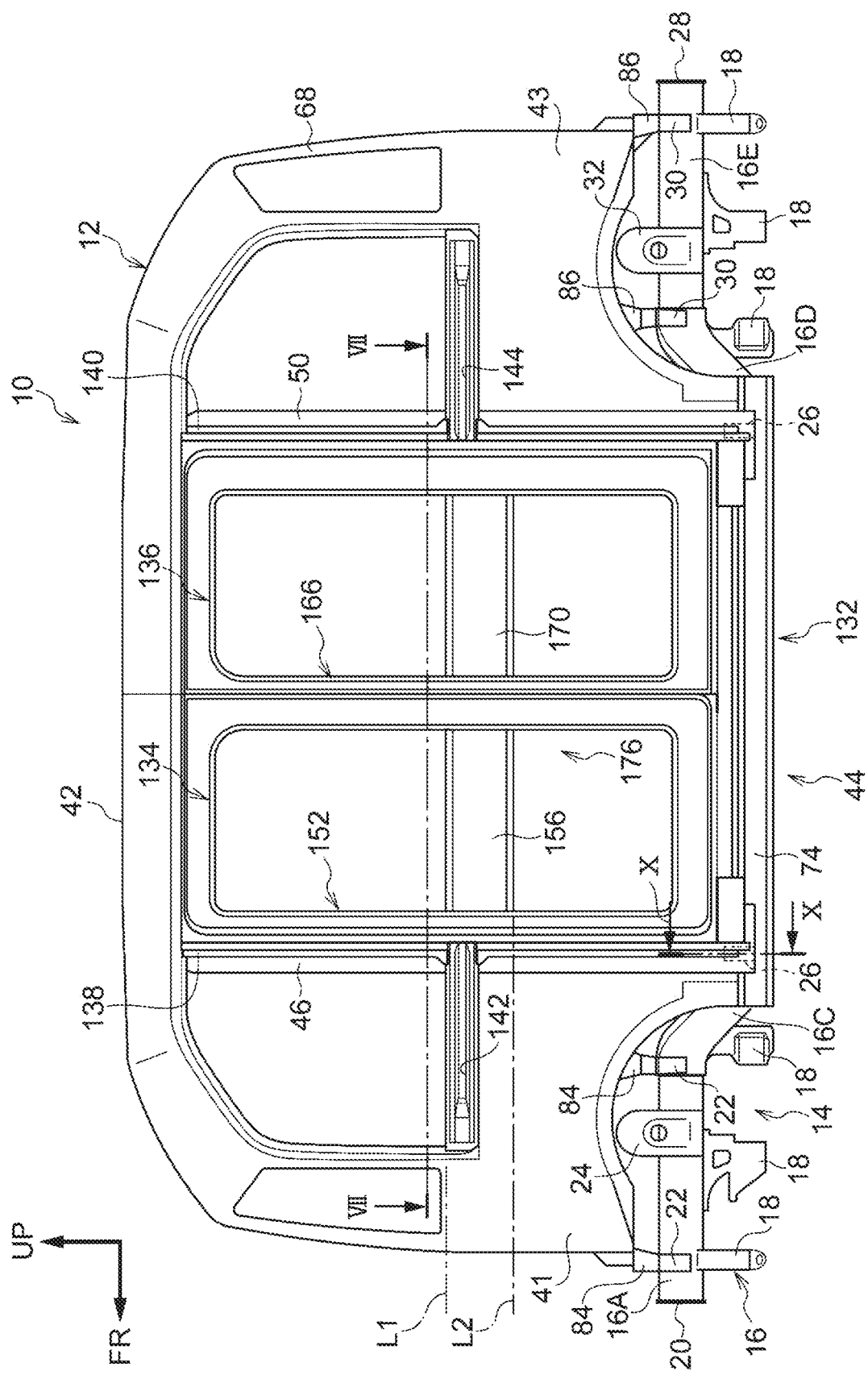
FIG. 2 is a side view schematically illustrating the configuration of the vehicle to which the vehicle skeleton structure according to the present embodiment is applied.

As also illustrated in FIGS. 2 and 9, the frame 14 includes a pair of side frame portions 16 disposed away from each other in the vehicle width direction and a plurality of cross portions 18 that extend between the side frame portions 16. Since the frame 14 is basically configured symmetrically in the vehicle front-rear direction and the vehicle width direction, the description of the configuration of the frame 14 will be omitted as appropriate below.

The side frame portion 16 extends in the vehicle front-rear direction as a whole, is configured to include a front frame portion 16A, a main frame portion 16B, kick portions 16C and 16D, and a rear frame portion 16E, and has a closed sectional structure in which the side frame portion 16 has a closed sectional surface as seen in the vehicle front-rear direction.

More particularly, the front frame portion 16A constitutes a portion of the side frame portion 16 on the front side in the vehicle front-rear direction, and extends straight in the vehicle front-rear direction. An attachment plate portion 20 is provided at an end portion of the front frame portion 16A on the front side in the vehicle front-rear direction. A front bumper reinforcement (not illustrated) is attached to the attachment plate portion 20.

In addition, the front frame portion 16A is provided with a pair of mount portions 22 disposed away from each other in the vehicle front-rear direction to support a portion of the vehicle body 12 on the front side in the vehicle front-rear direction. A suspension tower 24 is provided between the mount portions 22.

The main frame portion 16B constitutes a portion of the side frame portion 16 on the center side in the vehicle front-rear direction, is disposed on the outer side, in the vehicle width direction, and the lower side, in the vehicle up-down direction, of the front frame portion 16A, and extends straight in the vehicle front-rear direction. The main frame portion 16B is provided with a pair of mount portions 26 disposed away from each other in the vehicle front-rear direction to support a portion of the vehicle body 12 on the center side in the vehicle front-rear direction.

The kick portion 16C is interposed between the front frame portion 16A and the main frame portion 16B. The kick portion 16C extends rearward in the vehicle front-rear direction and outward in the vehicle width direction from the front frame portion 16A as seen in the vehicle up-down direction, and extends rearward in the vehicle front-rear direction and downward in the vehicle up-down direction from the front frame portion 16A as seen in the vehicle width direction.

On the other hand, the rear frame portion 16E constitutes a portion of the side frame portion 16 on the rear side in the vehicle front-rear direction, and is basically configured similarly to the front frame portion 16A. A rear bumper reinforcement (not illustrated) is attached via an attachment plate portion 28.

In addition, the rear frame portion 16E is provided with a pair of mount portions 30 disposed away from each other in the vehicle front-rear direction to support a portion of the vehicle body 12 on the rear side in the vehicle front-rear direction. A suspension tower 32 is provided between the mount portions 30.

The kick portion 16D is interposed between the rear frame portion 16E and the main frame portion 16B. The kick portion 16D extends forward in the vehicle front-rear direction and outward in the vehicle width direction from the rear frame portion 16E as seen in the vehicle up-down direction, and extends forward in the vehicle front-rear direction and downward in the vehicle up-down direction from the rear frame portion 16E as seen in the vehicle width direction.

As illustrated in FIGS. 9 and 10, a battery pack 34 is disposed between the main frame portions 16B of the frame 14. The battery pack 34 serves as a power supply portion that can supply power to a power unit (not illustrated) attached to the frame 14 etc. The battery pack 34 is configured to include a battery case 36 that constitutes the outer shell of the battery pack 34 and a plurality of battery modules (not illustrated) disposed inside the battery case 36. The battery case 36 is made of an aluminum alloy, by way of example. The battery pack 34 is disposed such that the main portion of the battery pack 34 is accommodated between the upper surface and the lower surface of the main frame portion 16B as seen in the vehicle width direction.

In addition, a cover panel 38 is disposed on the lower side, in the vehicle up-down direction, of the battery pack 34. The cover panel 38 serves as a cover panel portion that covers the battery pack 34 from the lower side in the vehicle up-down direction. The cover panel 38 is formed in the shape of a plate that extends in the vehicle front-rear direction and the vehicle width direction as seen in the vehicle up-down direction. A plurality of bead portions (not illustrated) is formed on the cover panel 38. The cover panel 38 is attached to the side frame portions 16 using an attachment member (not illustrated) in the state of extending between the side frame portions 16. Examples of a material that constitutes the cover panel 38 include a variety of materials such as a steel material and a carbon fiber reinforced resin. It is also possible that the cover panel 38 is made of an aluminum alloy so that the cover panel 38 is provided integrally with the battery case 36.

Figure 3:
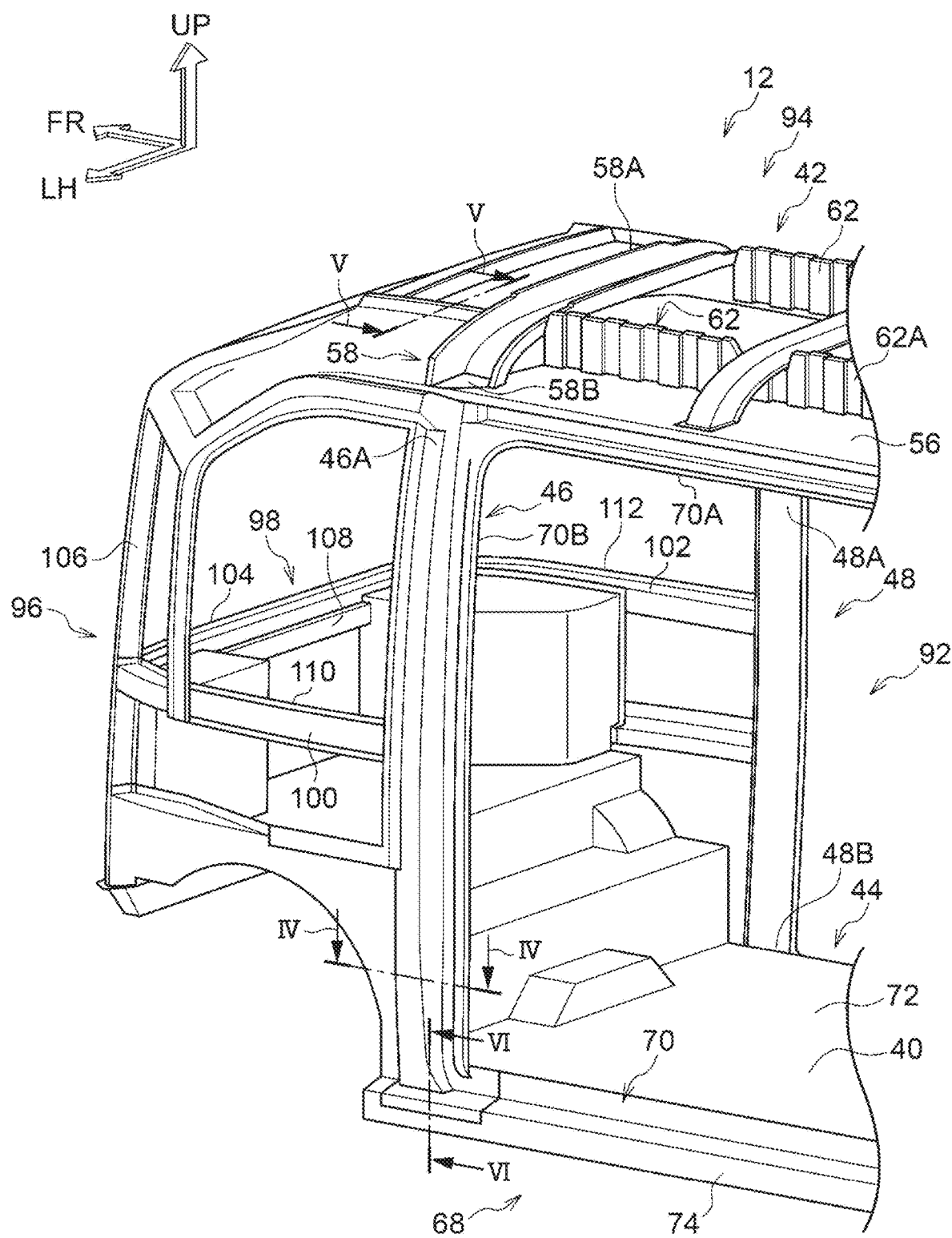
FIG. 3 is a perspective view schematically illustrating the configuration of a portion, on the front side in the vehicle front-rear direction, of a vehicle body of the vehicle to which the vehicle skeleton structure according to the present embodiment is applied.

Next, the configuration of the vehicle body 12 will be described. As illustrated in FIGS. 1 to 3, the vehicle body 12 is formed such that the outer shape of the vehicle body 12 is the shape of a box that is a generally rectangular parallelepiped that extends in the vehicle front-rear direction, and constitutes the main portion of a cabin 40. Since the vehicle body 12 is basically configured symmetrically with respect to a central line CL (see FIG. 9) which extends in the vehicle front-rear direction, the description of the configuration of the vehicle body 12 will be omitted as appropriate below.

The vehicle body 12 is configured to include a roof portion 42 that constitutes a portion of the vehicle body 12 on the upper side in the vehicle up-down direction, a floor portion 44 that constitutes a portion of the vehicle body 12 on the lower side in the vehicle up-down direction, and a first front pillar portion 46, a second front pillar portion 48, a first rear pillar portion 50, and a second rear pillar portion 52 that connect between the roof portion 42 and the floor portion 44 in the vehicle up-down direction.

Figure 5:
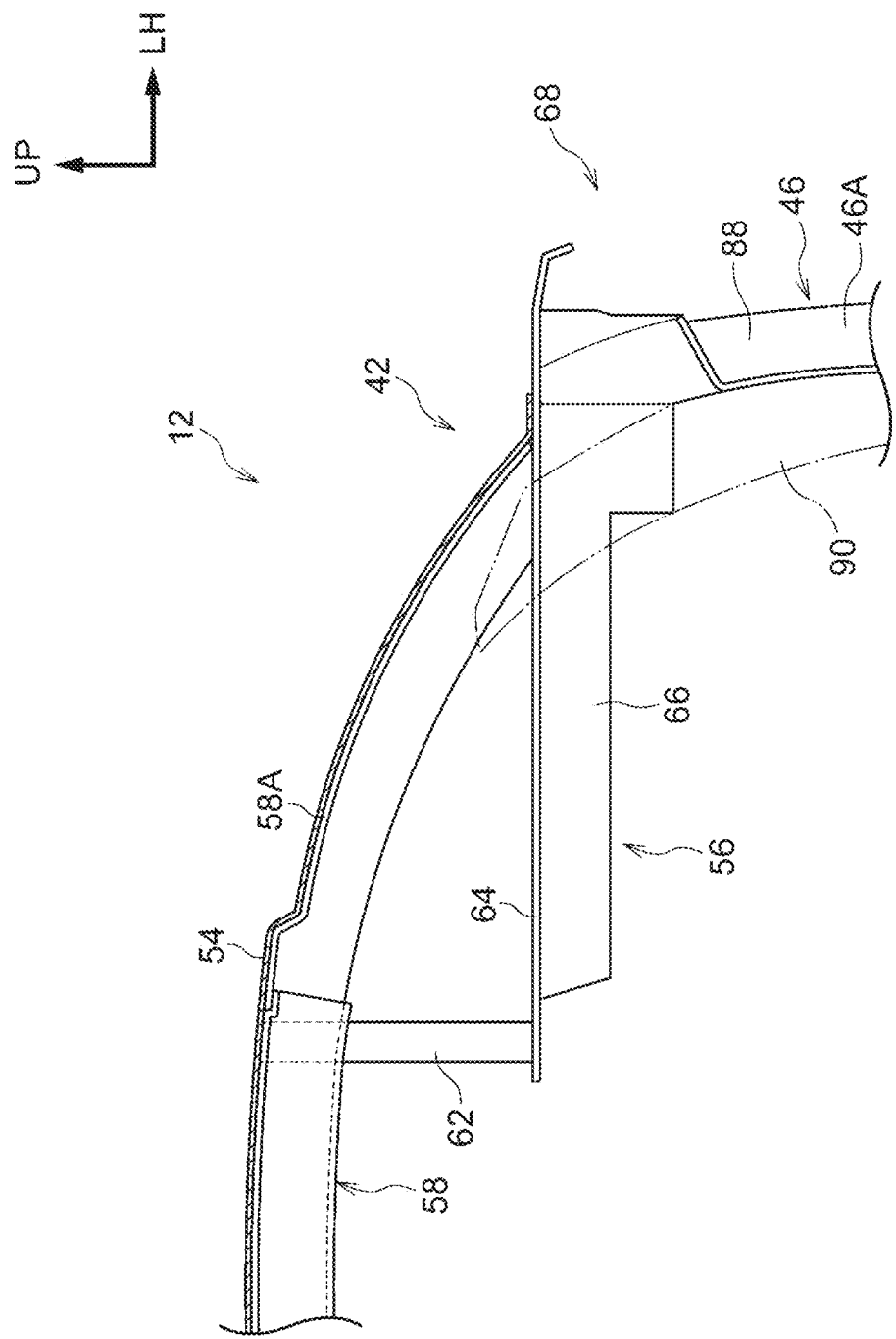
FIG. 5 is a sectional view schematically illustrating the configuration of a portion, on the upper side in the vehicle up-down direction, of the vehicle body of the vehicle to which the vehicle skeleton structure according to the present embodiment is applied as seen in the vehicle front-rear direction (a sectional view illustrating a state taken along the V-V line in FIG. 3)

As also illustrated in FIG. 5, the roof portion 42 is configured to include a roof panel 54 that constitutes the upper surface of the roof portion 42, a pair of roof side rails 56 that constitutes a portion of the roof portion 42 on the outer side in the vehicle width direction, and a front upper cross portion 58, a rear upper cross portion 60, and a pair of reinforcement panels 62 that reinforce the roof panel 54. In FIG. 3, the roof panel 54 is not illustrated in order to facilitate understanding of the configuration of the roof side rails 56 etc.

The roof panel 54 is in the shape of a rectangular plate arranged with its plate thickness direction corresponding to the vehicle up-down direction and with its longitudinal direction corresponding to the vehicle front-rear direction as seen in the vehicle up-down direction, and is curved to be convex toward the upper side in the vehicle up-down direction as seen in the vehicle front-rear direction.

The roof side rail 56 is disposed on the lower side, in the vehicle up-down direction, of the roof panel 54 along the peripheral edge portion of the roof panel 54 on the outer side in the vehicle width direction. The roof side rail 56 is configured to include a roof side rail upper 64 that constitutes a portion of the roof side rail 56 on the upper side in the vehicle up-down direction and a roof side rail lower 66 that constitutes a portion of the roof side rail 56 on the lower side in the vehicle up-down direction.

In addition, the roof side rail 56 is formed such that the outer shape of the roof side rail 56 is the shape of a generally rectangular parallelepiped with its dimension in the vehicle width direction set to be longer than its dimension in the vehicle up-down direction and that extends in the vehicle front-rear direction. An end portion of the roof panel 54 on the outer side in the vehicle width direction is joined to the roof side rail upper 64 at a joint portion (not illustrated) by welding etc.

A door opening portion 70 is provided at a first side portion 68 of the vehicle body 12 on a first side in the vehicle width direction (left side in the vehicle width direction). The door opening portion 70 is opened and closed by a front side door 134 and a rear side door 136 that serve as side doors to be discussed later. As illustrated in FIG. 3, the roof side rail 56 is disposed so as to extend along an upper edge portion 70A of the door opening portion 70. The front side door 134 and the rear side door 136 can be disposed on the lower side, in the vehicle up-down direction, of the roof side rail 56.

As illustrated in FIGS. 1, 3, and 5, the front upper cross portion 58 is disposed along the roof panel 54 on the front side, in the vehicle front-rear direction, of the door opening portion 70 and on the lower side, in the vehicle up-down direction, of the roof panel 54, and extends in the vehicle width direction. The front upper cross portion 58 is formed such that the sectional shape, as seen in the vehicle width direction, of the front upper cross portion 58 is the shape of a hat that opens toward the upper side in the vehicle up-down direction. A flange portion 58A of the front upper cross portion 58 is joined to the roof panel 54 at a joint portion (not illustrated) by welding etc. The front upper cross portion 58 constitutes a closed sectional structure, the sectional surface of which as seen in the vehicle width direction is a closed sectional surface, together with the roof panel 54.

An attachment piece portion 58B is provided at an end portion of the front upper cross portion 58 on the outer side in the vehicle width direction. The attachment piece portion 58B is joined to the roof side rail upper 64 at a joint portion (not illustrated) by welding etc.

On the other hand, the rear upper cross portion 60 is basically configured similarly to the front upper cross portion 58, and disposed along the roof panel 54 on the rear side, in the vehicle front-rear direction, of the door opening portion 70 and on the lower side, in the vehicle up-down direction, of the roof panel 54, and extends in the vehicle width direction. The rear upper cross portion 60 is joined to the roof panel 54 at a joint portion (not illustrated) by welding etc. to constitute a closed sectional structure, the sectional surface of which as seen in the vehicle width direction is a closed sectional surface, together with the roof panel 54. The rear upper cross portion 60 is also joined to the roof side rail upper 64 at a joint portion (not illustrated) by welding etc., as with the front upper cross portion 58.

As illustrated in FIGS. 3 and 5, the reinforcement panel 62 extends toward the upper side in the vehicle up-down direction from an end portion of the roof side rail upper 64 on the inner side in the vehicle width direction. A plurality of projections 62A that extend in the vehicle width direction are provided on each of a surface of the reinforcement panel 62 on the outer side in the vehicle width direction and a surface of the reinforcement panel 62 on the inner side in the vehicle width direction at predetermined intervals in the vehicle front-rear direction. An end portion of the reinforcement panel 62 on the upper side in the vehicle up-down direction is joined to the roof panel 54, and an end portion of the reinforcement panel 62 on the lower side in the vehicle up-down direction is joined to the roof side rail upper 64, at a joint portion (not illustrated) by welding etc.

Figure 6:
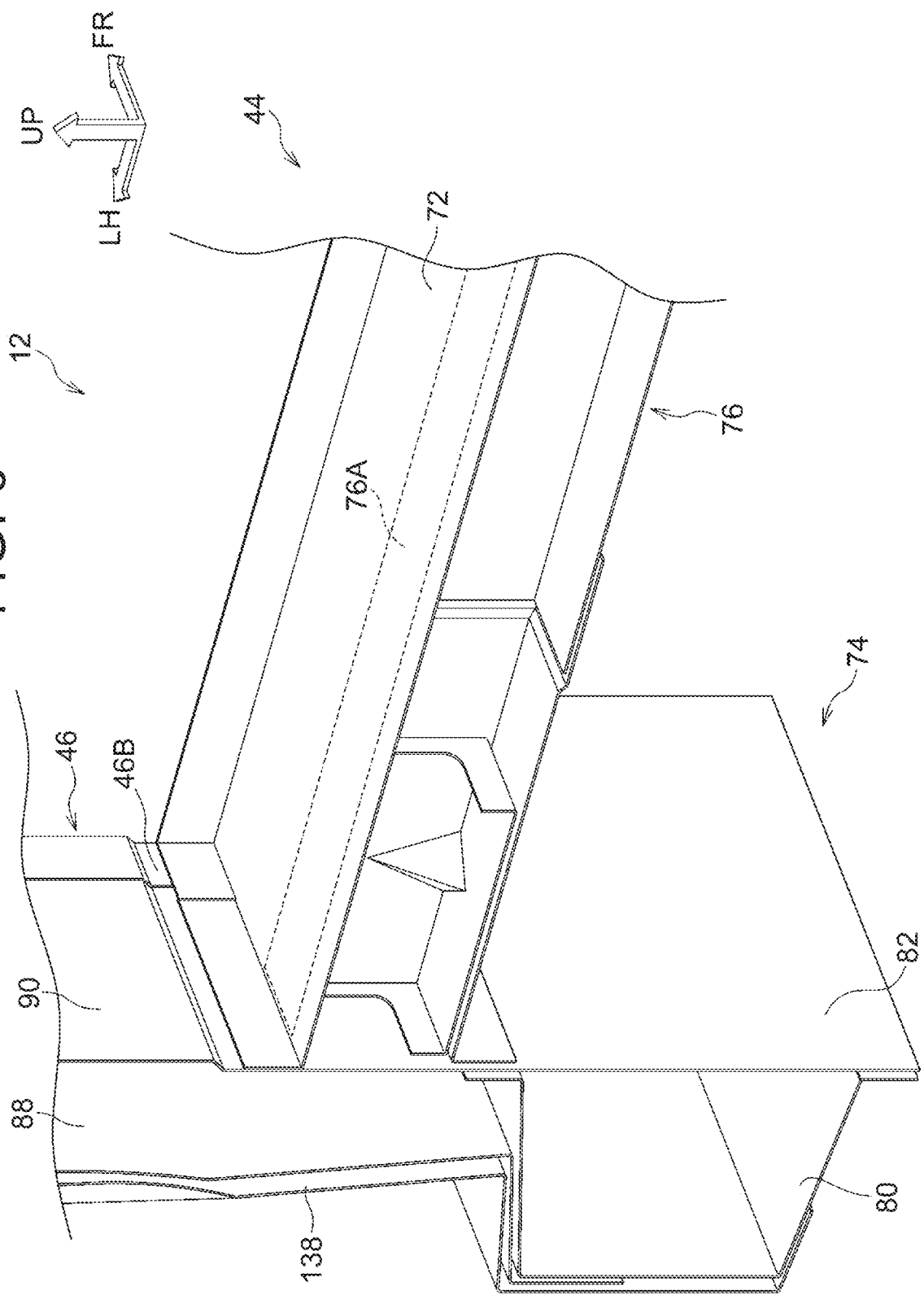
FIG. 6 is a perspective sectional view schematically illustrating the configuration around the pillar portion of the vehicle body of the vehicle to which the vehicle skeleton structure according to the present embodiment is applied (a sectional view illustrating a state taken along the VI-VI line in FIG. 3)

On the other hand, as illustrated in FIGS. 3 and 6, the floor portion 44 is configured to include a floor panel 72, a pair of rockers 74, and a front lower cross portion 76 and a rear lower cross portion 78 that reinforce the floor panel 72. The floor panel 72 is formed in the shape of a plate that extends in the vehicle front-rear direction and the vehicle width direction, and constitutes a floor surface of the cabin 40.

The rocker 74 extends in the vehicle front-rear direction along the peripheral edge portion of the floor panel 72 on the outer side in the vehicle width direction. The rocker 74 includes a rocker outer 80 that constitutes a portion of the rocker 74 on the outer side in the vehicle width direction and a rocker inner 82 that constitutes a portion of the rocker 74 on the inner side in the vehicle width direction, and has a closed sectional structure in which the rocker 74 has a closed sectional surface as seen in the vehicle front-rear direction. An end portion of the floor panel 72 on the outer side in the vehicle width direction is joined to a surface of the rocker inner 82 on the inner side in the vehicle width direction at a joint portion (not illustrated) by welding etc.

As illustrated in FIGS. 1 and 6, the front lower cross portion 76 is disposed on the lower side, in the vehicle up-down direction, of the floor panel 72 along the peripheral edge portion of the floor panel 72 on the front side in the vehicle front-rear direction and in the state of overlapping the front upper cross portion 58 as seen in the vehicle up-down direction. The front lower cross portion 76 is formed such that the sectional shape, as seen in the vehicle width direction, of the front lower cross portion 76 is the shape of a hat that opens toward the upper side in the vehicle up-down direction, and extends in the vehicle width direction.

The front lower cross portion 76 constitutes a closed sectional structure, the sectional surface of which as seen in the vehicle width direction is a closed sectional surface, together with the floor panel 72 with a pair of flange portions 76A, which are provided on both sides of the front lower cross portion 76 in the vehicle front-rear direction, joined to the floor panel 72 at a joint portion (not illustrated) by welding etc.

On the other hand, the rear lower cross portion 78 is basically configured similarly to the front lower cross portion 76, and disposed on the lower side, in the vehicle up-down direction, of the floor panel 72 along the peripheral edge portion of the floor panel 72 on the rear side in the vehicle front-rear direction and in the state of overlapping the rear upper cross portion 60 as seen in the vehicle up-down direction. The rear lower cross portion 78 is joined to the floor panel 72 at a joint portion (not illustrated) by welding etc. to constitute a closed sectional structure, the sectional surface of which as seen in the vehicle width direction is a closed sectional surface, together with the floor panel 72.

As illustrated in FIG. 2, in addition, a plurality of support portions 84 corresponding to the mount portions 22 is provided at a portion of the floor portion 44 on the front side in the vehicle front-rear direction, and a plurality of support portions 86 corresponding to the mount portions 30 is provided at a portion of the floor portion 44 on the rear side in the vehicle front-rear direction. The support portions 84 are fixed to the mount portions 22, and the support portions 86 are fixed to the mount portions 30, using a fixing member (not illustrated).

On the other hand, the mount portions 26 on the front side in the vehicle front-rear direction correspond to the front lower cross portion 76, and the front lower cross portion 76 is fixed to the mount portions 26 on the front side in the vehicle front-rear direction using a fixing member (not illustrated) as also illustrated in FIG. 10. Meanwhile, the mount portions 26 on the rear side in the vehicle front-rear direction correspond to the rear lower cross portion 78, and the rear lower cross portion 78 is fixed to the mount portions 26 on the rear side in the vehicle front-rear direction in the same manner as the front lower cross portion 76.

Figure 4:
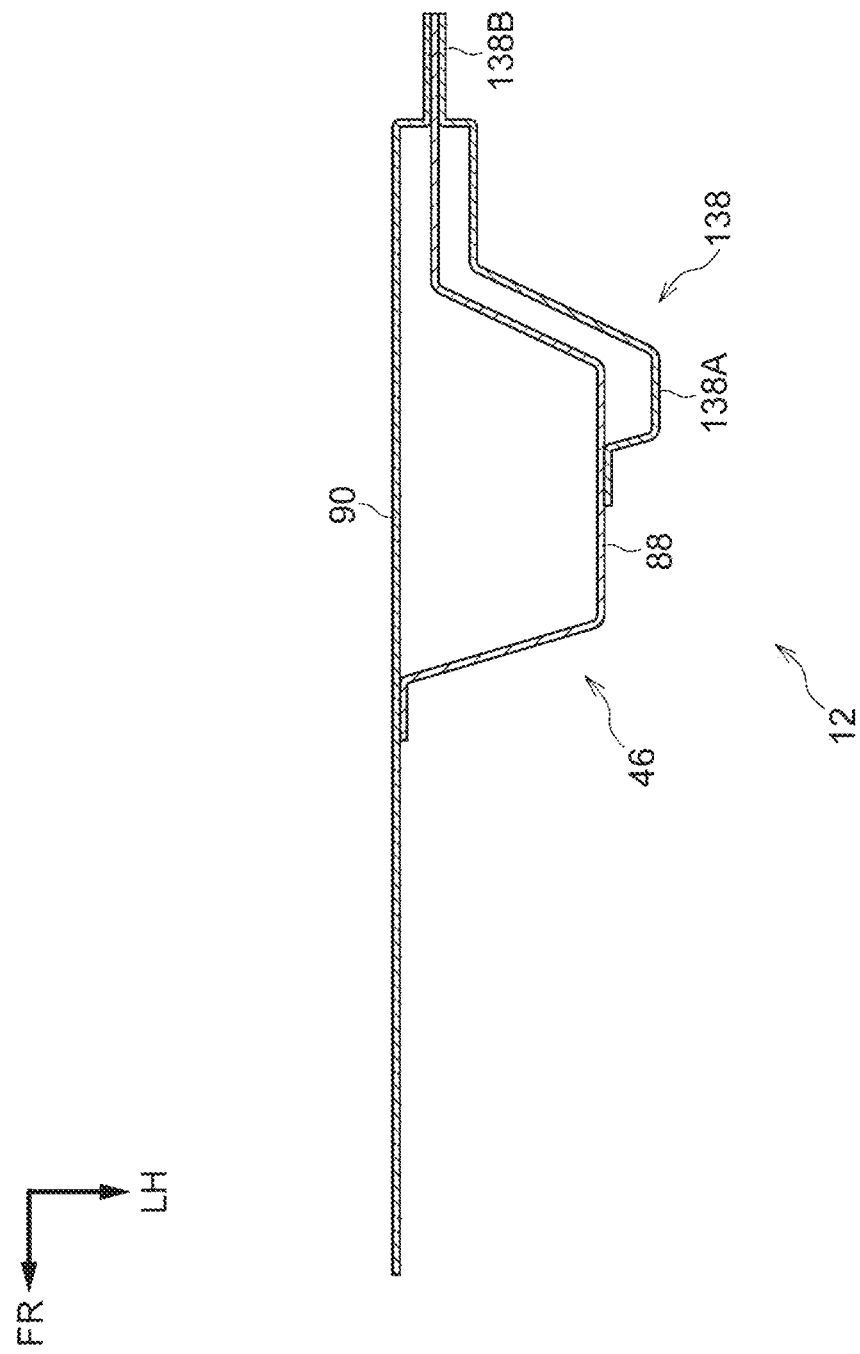
FIG. 4 is a sectional view schematically illustrating the configuration around a pillar portion of the vehicle body of the vehicle to which the vehicle skeleton structure according to the present embodiment is applied (a sectional view illustrating a state taken along the IV-IV line in FIG. 3)

As illustrated in FIG. 3, the first front pillar portion 46 constitutes a part of the first side portion 68, is disposed along a peripheral edge portion 70B of the door opening portion 70 on the front side in the vehicle front-rear direction, and extends in the vehicle up-down direction. As also illustrated in FIG. 4, the first front pillar portion 46 includes a pillar outer 88 that constitutes a portion of the first front pillar portion 46 on the outer side in the vehicle width direction and a pillar inner 90 that constitutes a portion of the first front pillar portion 46 on the inner side in the vehicle width direction, and has a closed sectional structure in which the first front pillar portion 46 has a closed sectional surface as seen in the vehicle up-down direction.

As illustrated in FIGS. 5 and 6, an end portion of the pillar outer 88 on the upper side in the vehicle up-down direction is joined to the roof side rail lower 66, and an end portion of the pillar outer 88 on the lower side in the vehicle up-down direction is joined to the rocker outer 80, at a joint portion (not illustrated) by welding etc.

In addition, an end portion of the pillar inner 90 on the upper side in the vehicle up-down direction is joined to the front upper cross portion 58 at a joint portion (not illustrated) by welding etc. That is, an upper portion 46A of the first front pillar portion 46 is directly coupled to the front upper cross portion 58. In FIG. 5, the pillar inner 90 is indicated by the long dashed double-short dashed line in order to facilitate understanding of the configuration of the roof side rail 56 etc. Alternatively, the upper portion 46A may be coupled to the front upper cross portion 58 via a reinforcement member etc.

On the other hand, as illustrated in FIG. 6, a portion of the pillar inner 90 on the lower side in the vehicle up-down direction is integrated with the rocker inner 82, and an end portion of the front lower cross portion 76 on the outer side in the vehicle width direction is joined to the portion of the pillar inner 90 on the lower side in the vehicle up-down direction at a joint portion (not illustrated) by welding etc. That is, a lower portion 46B of the first front pillar portion 46 is directly coupled to the front lower cross portion 76. The lower portion 46B may be coupled to the front lower cross portion 76 via a reinforcement member etc.

On the other hand, as illustrated in FIG. 3, the second front pillar portion 48 is basically configured similarly to the first front pillar portion 46, constitutes a part of a second side portion 92 on a second side in the vehicle width direction (right side in the vehicle width direction), and extends in the vehicle up-down direction so as to overlap the first front pillar portion 46 as seen in the vehicle width direction. In the present embodiment, the second side portion 92 is not provided with a door opening portion.

In addition, an upper portion 48A of the second front pillar portion 48 is joined to the roof side rail 56 and the front upper cross portion 58 at a joint portion (not illustrated) by welding etc., and the upper portion 48A is directly coupled to the front upper cross portion 58. On the other hand, a lower portion 48B of the second front pillar portion 48 is joined to the front lower cross portion 76 at a joint portion (not illustrated) by welding etc., and the lower portion 48B is directly coupled to the front lower cross portion 76. The upper portion 48A may be coupled to the front upper cross portion 58 via a reinforcement member etc. The lower portion 48B may be coupled to the front lower cross portion 76 via a reinforcement member etc.

With the first front pillar portion 46, the second front pillar portion 48, the front upper cross portion 58, and the front lower cross portion 76 disposed as described above, a front annular structure portion 94 formed annularly as seen in the vehicle front-rear direction is disposed in the vehicle body 12 so as to extend along the peripheral edge portion 70B of the door opening portion 70 as seen in the vehicle width direction.

As illustrated in FIGS. 1 and 3, in addition, the front annular structure portion 94 is connected to a front skeleton portion 98 of a front portion 96 that constitutes a portion of the vehicle body 12 on the front side in the vehicle front-rear direction via a first front reinforcement portion 100 and a second front reinforcement portion 102.

Figure 8:
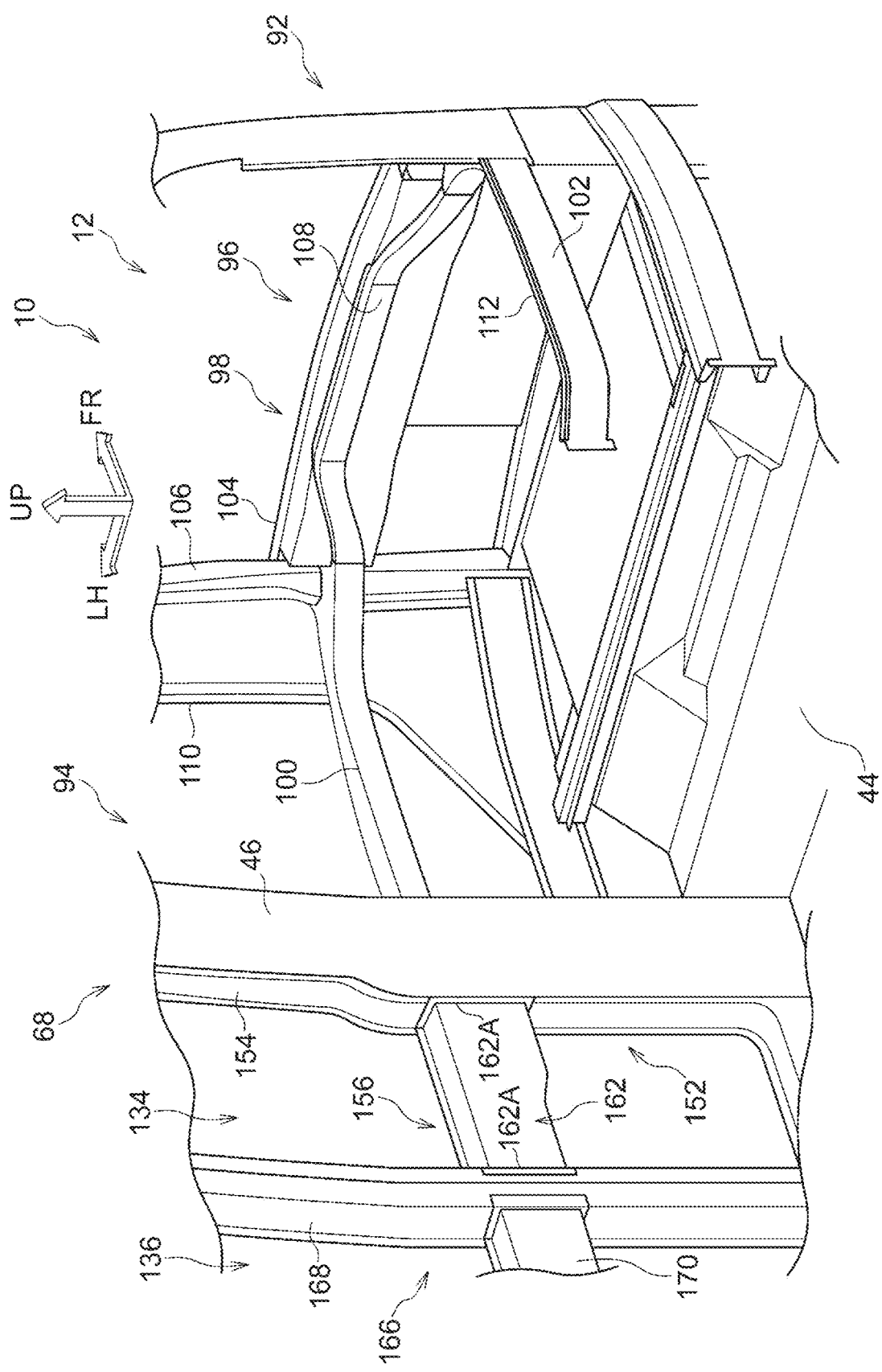
FIG. 8 is a perspective view schematically illustrating the configuration of a portion, on the front side in the vehicle front-rear direction, of the vehicle body of the vehicle to which the vehicle skeleton structure according to the present embodiment is applied.

As also illustrated in FIG. 8, the front skeleton portion 98 includes a pair of front pillar portions 106 disposed so as to extend along the peripheral edge portion, on the outer side in the vehicle width direction, of a front opening portion 104 that accommodates a windshield (not illustrated) and a front cross portion 108 disposed so as to extend along the peripheral edge portion of the front opening portion 104 on the lower side in the vehicle up-down direction.

Particularly, the front pillar portion 106 has a closed sectional structure in which the front pillar portion 106 has a closed sectional surface as seen in the vehicle up-down direction, extends in the vehicle up-down direction, and connects between a portion of the roof portion 42 on the front side in the vehicle front-rear direction and a portion of the floor portion 44 on the front side in the vehicle front-rear direction.

On the other hand, the front cross portion 108 has a closed sectional structure in which the front cross portion 108 has a closed sectional surface as seen in the vehicle width direction, and extends in the vehicle width direction. End portions of the front cross portion 108 on both sides in the vehicle width direction are joined to the front pillar portions 106 at a joint portion (not illustrated) by welding etc., and connect between the front pillar portions 106 in the vehicle width direction.

The first front reinforcement portion 100 is coupled to the front pillar portion 106 on the first side in the vehicle width direction and an end portion of the front cross portion 108 on the first side in the vehicle width direction. The second front reinforcement portion 102 is coupled to the front pillar portion 106 on the second side in the vehicle width direction and an end portion of the front cross portion 108 on the second side in the vehicle width direction.

Figure 7:
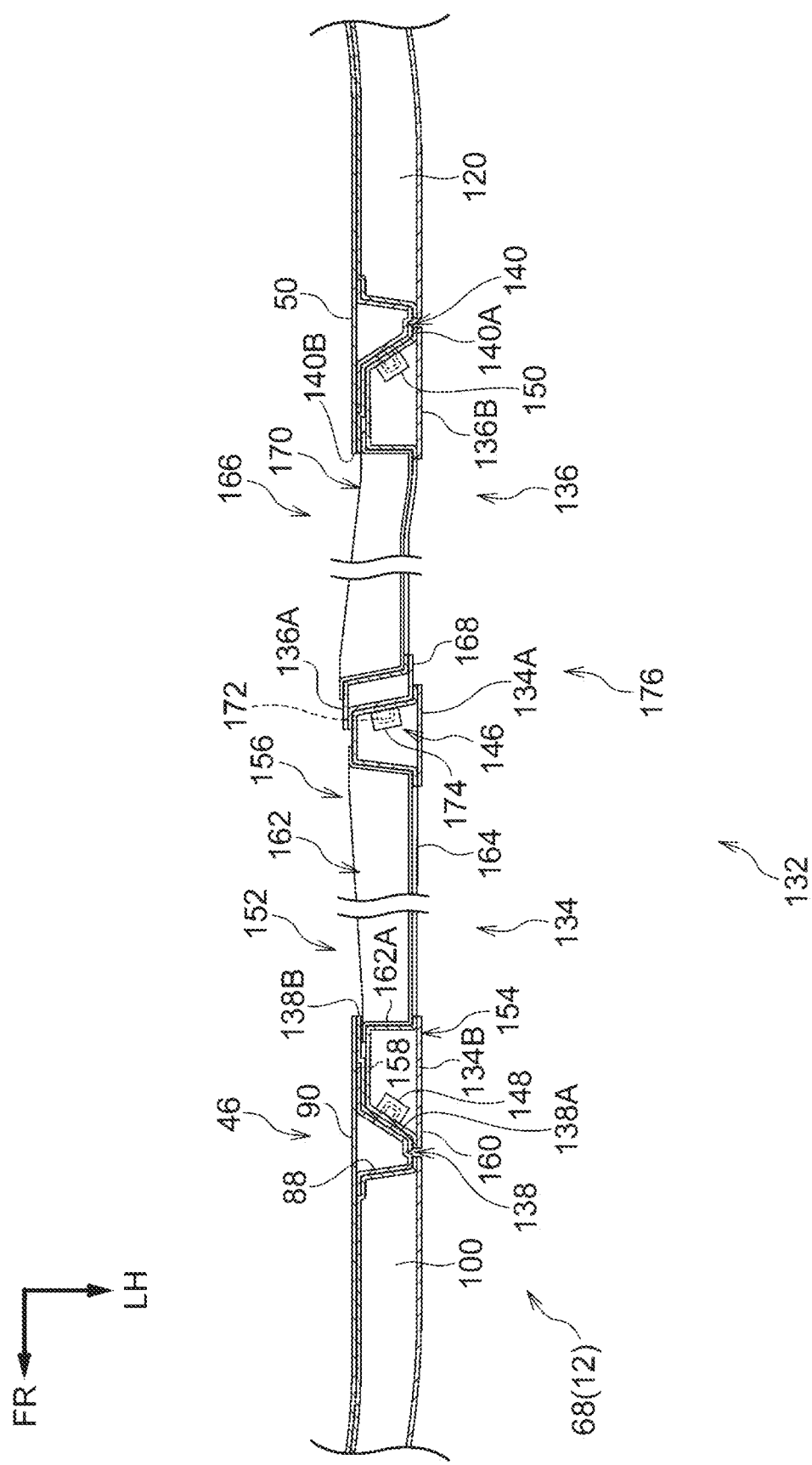
FIG. 7 is a sectional view schematically illustrating the configuration around side doors of the vehicle to which the vehicle skeleton structure according to the present embodiment is applied as seen in the vehicle up-down direction (a sectional view illustrating a state obtained by cutting along the VII-VII line in FIG. 2)

Particularly, as also illustrated in FIG. 7, the first front reinforcement portion 100 is provided at the first side portion 68 on the front side, in the vehicle front-rear direction, of the first front pillar portion 46, and disposed along the lower edge portion of a first front window opening portion 110. The first front reinforcement portion 100 has a closed sectional structure in which the first front reinforcement portion 100 has a closed sectional surface as seen in the vehicle front-rear direction, and extends in the vehicle front-rear direction while being curved to be convex toward the outer side in the vehicle width direction as seen in the vehicle up-down direction.

An end portion of the first front reinforcement portion 100 on the front side in the vehicle front-rear direction is joined to the front pillar portion 106 on the first side in the vehicle width direction and the front cross portion 108 at a joint portion (not illustrated) by welding etc. On the other hand, an end portion of the first front reinforcement portion 100 on the rear side in the vehicle front-rear direction is joined to the center portion, in the vehicle up-down direction, of the first front pillar portion 46 at a joint portion (not illustrated) by welding etc. in the state of abutting against the center portion from the front side in the vehicle front-rear direction.

On the other hand, as illustrated in FIG. 3, the second front reinforcement portion 102 is basically configured similarly to the first front reinforcement portion 100, and provided at the second side portion 92 on the front side, in the vehicle front-rear direction, of the second front pillar portion 48, and disposed along the lower edge portion of a second front window opening portion 112. An end portion of the second front reinforcement portion 102 on the front side in the vehicle front-rear direction is joined to the front pillar portion 106 on the second side in the vehicle width direction and the front cross portion 108 at a joint portion (not illustrated) by welding etc. On the other hand, an end portion of the second front reinforcement portion 102 on the rear side in the vehicle front-rear direction is joined to the center portion, in the vehicle up-down direction, of the second front pillar portion 48 at a joint portion (not illustrated) by welding etc. in the state of abutting against the center portion from the front side in the vehicle front-rear direction.

As illustrated in FIG. 1, the first rear pillar portion 50 constitutes a part of the first side portion 68, is disposed along a peripheral edge portion 70C of the door opening portion 70 on the rear side in the vehicle front-rear direction, and extends in the vehicle up-down direction. The first rear pillar portion 50 is basically configured mirror-symmetrically to the first front pillar portion 46 as seen in the vehicle width direction.

An upper portion 50A of the first rear pillar portion 50 is joined to the roof side rail 56 and the rear upper cross portion 60 at a joint portion (not illustrated) by welding etc., and the upper portion 50A is directly coupled to the rear upper cross portion 60. The upper portion 50A may be coupled to the rear upper cross portion 60 via a reinforcement member etc.

In addition, a lower portion 50B of the first rear pillar portion 50 is joined to the rear lower cross portion 78 at a joint portion (not illustrated) by welding etc., and the lower portion 50B is directly coupled to the rear lower cross portion 78. The upper portion 50A may be coupled to the rear upper cross portion 60 via a reinforcement member etc. The lower portion 50B may be coupled to the rear lower cross portion 78 via a reinforcement member etc.

On the other hand, the second rear pillar portion 52 is basically configured similarly to the first rear pillar portion 50, constitutes a part of the second side portion 92, and extends in the vehicle up-down direction so as to overlap the first rear pillar portion 50 as seen in the vehicle width direction.

An upper portion 52A of the second rear pillar portion 52 is joined to the roof side rail 56 and the rear upper cross portion 60 at a joint portion (not illustrated) by welding etc., and the upper portion 52A is directly coupled to the rear upper cross portion 60. The upper portion 52A may be coupled to the rear upper cross portion 60 via a reinforcement member etc.

In addition, a lower portion 52B of the second rear pillar portion 52 is joined to the rear lower cross portion 78 at a joint portion (not illustrated) by welding etc., and the lower portion 52B is directly coupled to the rear lower cross portion 78. The upper portion 52A may be coupled to the rear upper cross portion 60 via a reinforcement member etc. The lower portion 52B may be coupled to the rear lower cross portion 78 via a reinforcement member etc.

With the first rear pillar portion 50, the second rear pillar portion 52, the rear upper cross portion 60, and the rear lower cross portion 78 disposed as described above, a rear annular structure portion 114 formed annularly as seen in the vehicle front-rear direction is disposed in the vehicle body 12 so as to extend along the peripheral edge portion 70C of the door opening portion 70 as seen in the vehicle width direction.

In addition, the rear annular structure portion 114 is connected to a rear skeleton portion 118 of a rear portion 116 that constitutes a portion of the vehicle body 12 on the rear side in the vehicle front-rear direction via a first rear reinforcement portion 120 and a second rear reinforcement portion 122.

The rear skeleton portion 118 includes a pair of rear pillar portions (not illustrated) disposed so as to extend along the peripheral edge portion, on the outer side in the vehicle width direction, of a rear opening portion 124 that accommodates a rear glass (not illustrated) and a rear cross portion 126 disposed so as to extend along the peripheral edge portion, on the lower side in the vehicle up-down direction, of the rear opening portion 124, and is basically configured similarly to the front skeleton portion 98 of the front portion 96.

The first rear reinforcement portion 120 is coupled to the rear pillar portion on the first side in the vehicle width direction and an end portion of the rear cross portion 126 on the first side in the vehicle width direction. The second rear reinforcement portion 122 is coupled to the rear pillar portion on the second side in the vehicle width direction and an end portion of the rear cross portion 126 on the second side in the vehicle width direction.

Particularly, as also illustrated in FIG. 7, the first rear reinforcement portion 120 is basically configured mirror-symmetrically with respect to the first front reinforcement portion 100 as seen in the vehicle width direction, and provided in the first side portion 68 on the rear side, in the vehicle front-rear direction, of the first rear pillar portion 50, and disposed along the lower edge portion of a first rear window opening portion 128. An end portion of the first rear reinforcement portion 120 on the rear side in the vehicle front-rear direction is joined to the rear pillar portion on the first side in the vehicle width direction and the rear cross portion 126 at a joint portion (not illustrated) by welding etc. On the other hand, an end portion of the first rear reinforcement portion 120 on the front side in the vehicle front-rear direction is joined to the center portion, in the vehicle up-down direction, of the first rear pillar portion 50 at a joint portion (not illustrated) by welding etc. in the state of abutting against the center portion from the rear side in the vehicle front-rear direction.

On the other hand, the second rear reinforcement portion 122 is basically configured similarly to the first rear reinforcement portion 120, and provided at the second side portion 92 on the rear side, in the vehicle front-rear direction, of the second rear pillar portion 52, and disposed along the lower edge portion of a second rear window opening portion 130. An end portion of the second rear reinforcement portion 122 on the rear side in the vehicle front-rear direction is joined to the rear pillar portion on the second side in the vehicle width direction and the rear cross portion 126 at a joint portion (not illustrated) by welding etc. On the other hand, an end portion of the second rear reinforcement portion 122 on the front side in the vehicle front-rear direction is joined to the center portion, in the vehicle up-down direction, of the second rear pillar portion 52 at a joint portion (not illustrated) by welding etc. in the state of abutting against the center portion from the rear side in the vehicle front-rear direction.

In addition, the second side portion 92 is provided with a side reinforcement portion 178, and the second front pillar portion 48 and the second rear pillar portion 52 are coupled to each other by the side reinforcement portion 178. Specifically, the side reinforcement portion 178 has a closed sectional structure in which the side reinforcement portion 178 has a closed sectional surface as seen in the vehicle front-rear direction, and extends in the vehicle front-rear direction. A part of a front portion of the side reinforcement portion 178 is joined to the second front pillar portion 48, and a part of a rear portion of the side reinforcement portion 178 is joined to the second rear pillar portion 52, at a joint portion (not illustrated) by welding etc. The rear portion of the side reinforcement portion 178 is located rearward of the front portion of the side reinforcement portion 178 in the vehicle front-rear direction. The side reinforcement portion 178 may be coupled to the second front pillar portion 48 and the second rear pillar portion 52 via a reinforcement member etc.

The outer side, in the vehicle width direction, of the first front reinforcement portion 100 is covered by a body outer panel 41. The outer side, in the vehicle width direction, of the first rear reinforcement portion 120 is covered by a body outer panel 43. In addition, the outer side, in the vehicle width direction, of the side reinforcement portion 178 is also covered by a body outer panel (not illustrated). In FIG. 3 etc., such body outer panels are not illustrated in order to facilitate understanding of the configuration of the vehicle body 12.

Next, the configuration of a slide door device 132 disposed at the first side portion 68 of the vehicle body 12 will be described. As illustrated in FIGS. 1, 2, and 7, the slide door device 132 includes a front side door 134, a rear side door 136, a front door base 138, a rear door base 140, a front rail portion 142, a rear rail portion 144, and a center lock device 146, a front lock device 148, and a rear lock device 150 that serve as a lock device. In FIG. 2, some of the constituent elements of the slide door device 132 are not illustrated in order to facilitate understanding of the configuration of the slide door device 132.

The front side door 134 includes a door frame 152 and a door glass 153, is formed in the shape of a plate arranged with its longitudinal direction corresponding to the vehicle up-down direction as seen in the vehicle width direction, and is slidable in the vehicle front-rear direction with respect to the vehicle body 12 as discussed later. The door frame 152 is made of steel, by way of example.

Particularly, the door frame 152 includes a frame body portion 154 formed in a rectangular frame shape as seen in the vehicle width direction and a front belt line reinforcement 156 (hereinafter referred to as "front RF 156") that serves as a front door reinforcement portion that is disposed at the center portion, in the vehicle up-down direction, of the door frame 152 and that extends in the vehicle front-rear direction.

The frame body portion 154 is configured to include a frame inner 158 that constitutes a portion of the frame body portion 154 on the inner side in the vehicle width direction and a frame outer 160 that constitutes a portion of the frame body portion 154 on the outer side in the vehicle width direction. The frame inner 158 is formed such that its portion that extends in the vehicle width direction and its portion that extends in the vehicle up-down direction each have a sectional surface, as seen in the extending direction, in the shape of a hat that opens toward the outer side in the vehicle width direction. The frame outer 160 is formed in a flat plate shape as a whole.

The frame inner 158 and the frame outer 160 are joined to each other at a joint portion (not illustrated) by welding etc. The frame body portion 154 has a closed sectional structure in which its portion that extends in the vehicle width direction and its portion that extends in the vehicle up-down direction each have a closed sectional surface as seen in the extending direction.

The front RF 156 is configured to include a reinforcement inner 162 that constitutes a portion of the front RF 156 on the inner side in the vehicle width direction and a reinforcement outer 164 that constitutes a portion of the front RF 156 on the outer side in the vehicle width direction. The reinforcement inner 162 is formed such that the sectional shape, as seen in the vehicle front-rear direction, of the reinforcement inner 162 is the shape of a hat that opens toward the outer side in the vehicle width direction. The reinforcement outer 164 is formed in a flat plate shape.

The reinforcement inner 162 and the reinforcement outer 164 are joined to each other at a joint portion (not illustrated) by welding etc. The front RF 156 has a closed sectional structure, the sectional surface of which as seen in the vehicle front-rear direction is a closed sectional surface. In addition, as also illustrated in FIG. 8, the front RF 156 is attached to the frame body portion 154 with a flange portion 162A, which is provided on the reinforcement inner 162, joined to the frame body portion 154 at a joint portion (not illustrated) by welding etc.

On the other hand, the rear side door 136 includes a door frame 166 and a door glass 167, is formed in the shape of a plate arranged with its longitudinal direction corresponding to the vehicle up-down direction as seen in the vehicle width direction, and is slidable in the vehicle front-rear direction with respect to the vehicle body 12 as discussed later. The door frame 166 is made of steel, by way of example.

The door frame 166 includes a frame body portion 168 and a rear belt line reinforcement 170 (hereinafter referred to as "rear RF 170") that serves as a rear door reinforcement portion. The door frame 166 is basically configured similarly to the door frame 152, but is different from the door frame 152 in the configuration of a portion on the front side in the vehicle front-rear direction.

Particularly, a portion of the frame body portion 168 on the front side in the vehicle front-rear direction has a closed sectional structure in which the sectional surface, as seen in the vehicle up-down direction, of such a portion is a parallelogram shape. This portion abuts against a portion of the frame body portion 154 on the rear side in the vehicle front-rear direction in the state of overlapping the latter portion as seen in the vehicle width direction in a closed state in which the door opening portion 70 is closed by the front side door 134 and the rear side door 136.

That is, when the front side door 134 and the rear side door 136 are in the closed state, a rear end portion 134A of the front side door 134 and a front end portion 136A of the rear side door 136 overlap each other as seen in the vehicle width direction. Particularly, in the closed state, a part of the front end portion 136A of the rear side door 136 is covered by the rear end portion 134A of the front side door 134 from the outer side in the vehicle width direction.

The rear end portion 134A of the front side door 134 and the front end portion 136A of the rear side door 136 are coupled to each other via the center lock device 146 which includes a striker 172 provided at the front end portion 136A and a door latch 174 provided at the rear end portion 134A.

In addition, the front RF 156 and the rear RF 170 which are configured as described above can be considered to function as a side door reinforcement portion 176 that reinforces the front side door 134 and the rear side door 136 which are integrated with each other in the closed state.

The upper edge portion of the side door reinforcement portion 176 coincides with the lower edge portions of the first front window opening portion 110 and the first rear window opening portion 128. In addition, most of the first front reinforcement portion 100 and the second front reinforcement portion 102 discussed above, specifically 90% or more thereof, is disposed between a first line L1, which extends in the vehicle front-rear direction and passes through the upper edge portion of the side door reinforcement portion 176, and a second line L2, which extends in the vehicle front-rear direction and passes through the lower edge portion of the side door reinforcement portion 176, as seen in the vehicle width direction.

The proportion of a portion of the first front reinforcement portion 100 and the second front reinforcement portion 102 to be accommodated between the first line L1 and the second line L2 as seen in the vehicle width direction is changeable, as appropriate, in accordance with the specifications etc. of the vehicle 10. That is, it is only necessary that at least a part of the first front reinforcement portion 100 and the second front reinforcement portion 102 should be accommodated between the first line L1 and the second line L2 as seen in the vehicle width direction.

In addition, the side reinforcement portion 178 discussed above is disposed so as to overlap the side door reinforcement portion 176 as seen in the vehicle width direction.

In the closed state, as illustrated in FIG. 1, an all-around annular structure portion 180 is constructed in the vehicle 10, the all-around annular structure portion 180 including the side door reinforcement portion 176, the first front reinforcement portion 100, the first rear reinforcement portion 120, the front skeleton portion 98, the rear skeleton portion 118, the side reinforcement portion 178, the second front reinforcement portion 102, and the second rear reinforcement portion 122 and being formed annularly as seen in the vehicle up-down direction.

On the other hand, as also illustrated in FIG. 4, the front door base 138 is configured to include an attachment piece portion 138A disposed along the first front pillar portion 46 and an extended piece portion 138B extended from the attachment piece portion 138A toward the rear side in the vehicle front-rear direction, and the attachment piece portion 138A is joined to the first front pillar portion 46 at a joint portion (not illustrated) by welding etc. That is, the front door base 138 also functions as a part of the first front pillar portion 46.

In addition, an actuator (not illustrated) for the front side door 134 is attached to the extended piece portion 138B of the front door base 138. When this actuator is driven, the front side door 134 is slid in the vehicle front-rear direction while being guided by the front rail portion 142 which is provided along the first front reinforcement portion 100.

In the closed state, in addition, the front door base 138 is coupled to a front end portion 134B of the front side door 134 via the front lock device 148 which is configured similarly to the center lock device 146. That is, in the closed state, the frame body portion 154 of the door frame 152 can be considered as a member interposed between the first front pillar portion 46 and the side door reinforcement portion 176. In the closed state, the extended piece portion 138B of the front door base 138 overlaps a portion of the front side door 134 on the front side in the vehicle front-rear direction, including the front end portion of the front RF 156, as seen in the vehicle width direction.

On the other hand, the rear door base 140 is configured to include an attachment piece portion 140A disposed along the first rear pillar portion 50 and an extended piece portion 140B extended from the attachment piece portion 140A toward the rear side in the vehicle front-rear direction, and the attachment piece portion 140A is joined to the first rear pillar portion 50 at a joint portion (not illustrated) by welding etc. That is, the rear door base 140 also functions as a part of the first rear pillar portion 50.

In addition, an actuator (not illustrated) for the rear side door 136 is attached to the extended piece portion 140B of the rear door base 140. When this actuator is driven, the rear side door 136 is slid in the vehicle front-rear direction while being guided by the rear rail portion 144 which is provided along the first rear reinforcement portion 120.

In the closed state, in addition, the rear door base 140 is coupled to a rear end portion 136B of the rear side door 136 via the rear lock device 150 which is configured similarly to the center lock device 146. That is, in the closed state, the frame body portion 168 of the door frame 166 can be considered as a member interposed between the first rear pillar portion 50 and the side door reinforcement portion 176. In the closed state, the extended piece portion 140B of the rear door base 140 overlaps a portion of the rear side door 136 on the rear side in the vehicle front-rear direction, including the rear end portion of the rear RF 170, as seen in the vehicle width direction.

Functions and Effects of Present Embodiment

Next, the functions and the effects of the present embodiment will be described.

In the present embodiment, as illustrated in FIG. 1, the door opening portion 70 is provided at the first side portion 68, on the first side in the vehicle width direction, of the vehicle body 12, and the door opening portion 70 is opened and closed by the front side door 134 and the rear side door 136.

From the viewpoint of the convenience of the vehicle 10, it is preferable to secure a large door opening portion 70 at the first side portion 68 of the vehicle body 12. However, providing a large door opening portion 70 at the first side portion 68 of the vehicle body 12 leaves room for improvement in terms of securing the rigidity of the vehicle body 12 against a load in the vehicle width direction input to the vehicle 10.

In the present embodiment, the first front pillar portion 46 is provided which extends in the vehicle up-down direction along the peripheral edge portion 70B, on the front side in the vehicle front-rear direction, of the door opening portion 70, and the second front pillar portion 48 which extends in the vehicle up-down direction is provided at the second side portion 92, on the second side in the vehicle width direction, of the vehicle body 12. The front upper cross portion 58 which extends in the vehicle width direction is directly coupled to the upper portion 46A of the first front pillar portion 46 and the upper portion 48A of the second front pillar portion 48.

On the other hand, the front lower cross portion 76 which extends in the vehicle width direction is directly coupled to the lower portion 46B of the first front pillar portion 46 and the lower portion 48B of the second front pillar portion 48.

Therefore, the front annular structure portion 94 which includes the first front pillar portion 46, the second front pillar portion 48, the front upper cross portion 58, and the front lower cross portion 76 and which is formed annularly as seen in the vehicle front-rear direction is disposed so as to extend along the peripheral edge portion 70B, on the front side in the vehicle front-rear direction, of the door opening portion 70 as seen in the vehicle width direction.

In addition, the first rear pillar portion 50 is provided which extends in the vehicle up-down direction along the peripheral edge portion 70C, on the rear side in the vehicle front-rear direction, of the door opening portion 70, and the second rear pillar portion 52 which extends in the vehicle up-down direction is provided at the second side portion 92, on the second side in the vehicle width direction, of the vehicle body 12. The rear upper cross portion 60 which extends in the vehicle width direction is coupled to the upper portion 50A of the first rear pillar portion 50 and the upper portion 52A of the second rear pillar portion 52, either directly or via a member.

On the other hand, the rear lower cross portion 78 which extends in the vehicle width direction is directly coupled to the lower portion 50B of the first rear pillar portion 50 and the lower portion 52B of the second rear pillar portion 52.

Therefore, the rear annular structure portion 114 which includes the first rear pillar portion 50, the second rear pillar portion 52, the rear upper cross portion 60, and the rear lower cross portion 78 and which is formed annularly as seen in the vehicle front-rear direction is disposed so as to extend along the peripheral edge portion 70C, on the rear side in the vehicle front-rear direction, of the door opening portion 70 as seen in the vehicle width direction.

With the present embodiment, as a result, a load in the vehicle width direction input to the vicinity of the door opening portion 70 of the vehicle body 12 can be distributed over a wide range of the vehicle body 12 via the front annular structure portion 94 and the rear annular structure portion 114, and deformation of the vehicle body 12 due to the load can be suppressed. Thus, with the present embodiment, it is possible to secure the rigidity of the vehicle body 12 against a load in the vehicle width direction input to the vehicle 10 while securing a large door opening portion 70 at the first side portion 68 of the vehicle 10.

Moreover, a part of the front annular structure portion 94 and the rear annular structure portion 114 is provided along the roof portion 42 of the vehicle body 12. Therefore, a load input from the side of the roof portion 42 to the vehicle body 12 can also be distributed over a wide range of the vehicle body 12. Therefore, with the present embodiment, deformation of the vehicle body 12 due to a load input from the side of the roof portion 42 can be suppressed when the vehicle 10 is overturned etc.

More particularly, in the present embodiment, each of the front upper cross portion 58 and the rear upper cross portion 60 constitutes a closed sectional structure together with the roof panel 54 which constitutes a part of the vehicle body 12 on the upper side in the vehicle up-down direction, and the roof panel 54 is reinforced by the closed sectional structure. Therefore, with the present embodiment, it is possible to secure the rigidity of a portion of the vehicle body 12 on the upper side in the vehicle up-down direction against a load in the vehicle width direction input to the vehicle 10 and a load input from the side of the roof portion 42.

In the present embodiment, in addition, each of the front lower cross portion 76 and the rear lower cross portion 78 constitutes a closed sectional structure together with the floor panel 72 which constitutes a part of the vehicle body 12 on the lower side in the vehicle up-down direction, and the floor panel 72 is reinforced by the closed sectional structure. Therefore, with the present embodiment, it is possible to secure the rigidity of a portion of the vehicle body 12 on the lower side in the vehicle up-down direction against a load in the vehicle width direction input to the vehicle 10.

In the present embodiment, in addition, the front side door 134 is disposed on the side of the first front pillar portion 46, and the rear side door 136 is disposed on the side of the first rear pillar portion 50, at the first side portion 68. Therefore, it is possible to suppress an increase in the size of the side doors, even if an increase in the size of the door opening portion 70 is attempted, compared to a configuration in which the door opening portion 70 which is provided at the first side portion 68 is opened and closed by a single side door. Thus, with the present embodiment, it is possible to suppress an increase in the space required to open and close the side doors that accompanies an increase in the size of the door opening portion 70 which is provided in the vehicle 10.

In the present embodiment, in addition, the side door reinforcement portion 176 which extends in the vehicle front-rear direction is disposed in the front side door 134 and the rear side door 136, and the front side door 134 and the rear side door 136 are reinforced by the side door reinforcement portion 176. In addition, in the closed state in which the door opening portion 70 is closed by the front side door 134 and the rear side door 136, a part of a front portion of the side door reinforcement portion 176 is coupled to the first front pillar portion 46 via a member, and a part of a rear portion of the side door reinforcement portion 176 is coupled to the first rear pillar portion 50 via a member. The rear portion of the side door reinforcement portion 176 is located rearward of the front portion of the side door reinforcement portion 176 in the vehicle front-rear direction. Therefore, a load in the vehicle width direction input to the front side door 134 and the rear side door 136 is transferred to the first front pillar portion 46 and the second rear reinforcement portion 122 via the side door reinforcement portion 176.

In addition, the first front reinforcement portion 100 which extends in the vehicle front-rear direction is disposed at the first side portion 68 of the vehicle body 12 on the front side, in the vehicle front-rear direction, of the first front pillar portion 46. The first front reinforcement portion 100 is connected to the first front pillar portion 46 on the rear side in the vehicle front-rear direction, and connected to the front skeleton portion 98 of the front portion 96 of the vehicle body 12 on the front side in the vehicle front-rear direction.

On the other hand, the first rear reinforcement portion 120 which extends in the vehicle front-rear direction is disposed at the first side portion 68 on the rear side, in the vehicle front-rear direction, of the first rear pillar portion 50. The first rear reinforcement portion 120 is connected to the first rear pillar portion 50 on the front side in the vehicle front-rear direction, and connected to the rear skeleton portion 118 of the rear portion 116 of the vehicle body 12 on the rear side in the vehicle front-rear direction.

Therefore, a load transferred from the front side door 134 and the rear side door 136 to the first front pillar portion 46 and the first rear pillar portion 50 can also be distributed to the front portion 96 and the rear portion 116 of the vehicle body 12 via the first front reinforcement portion 100 and the first rear reinforcement portion 120.

In the present embodiment, in addition, at least a part of the first front reinforcement portion 100 and the first rear reinforcement portion 120 is accommodated between the first line L1, which extends in the vehicle front-rear direction and passes through the upper edge portion of the side door reinforcement portion 176, and the second line L2, which extends in the vehicle front-rear direction and passes through the lower edge portion of the side door reinforcement portion 176, as seen in the vehicle width direction. Therefore, it is possible to suppress generation of a bending moment in the vehicle up-down direction due to a load transferred from the side of the side door reinforcement portion 176 to the first front reinforcement portion 100 and the first rear reinforcement portion 120, and secure the efficiency of transfer of the load to the front portion 96 and the rear portion 116 of the vehicle body 12. Thus, with the present embodiment, a load in the vehicle width direction input to the vehicle 10 can be distributed over the entire vehicle body 12.

In the present embodiment, in addition, the front side door 134 is reinforced by the front RF 156 which extends in the vehicle front-rear direction, and the rear side door 136 is reinforced by the rear RF 170 which extends in the vehicle front-rear direction.

In the case where a load in the vehicle width direction is input to the side of the first side portion 68 of the vehicle 10, it is considered that the load may affect the inside of the cabin 40 of the vehicle 10 if the load cannot be supported by the front RF 156 and the rear RF 170.

In the present embodiment, as illustrated in FIG. 7, in the closed state in which the door opening portion 70 is closed by the front side door 134 and the rear side door 136, the rear end portion 134A of the front side door 134 and the front end portion 136A of the rear side door 136 are coupled to each other via the center lock device 146 in the state of overlapping each other as seen in the vehicle width direction.

Therefore, a load in the vehicle width direction input to at least one of the front side door 134 and the rear side door 136 can be supported by the front RF 156 and the rear RF 170, and hence can be supported by the first front pillar portion 46 and the first rear pillar portion 50. Thus, with the present embodiment, it is possible to suppress the effect of a load in the vehicle width direction input to the vehicle 10 on the inside of the cabin 40.

In addition, in the present embodiment, as illustrated in FIG. 2, the front side door 134 and the rear side door 136 are slidable in the vehicle front-rear direction. The front rail portion 142 which guides the front side door 134 is provided on the first front reinforcement portion 100, and the rear rail portion 144 which guides the rear side door 136 is provided on the first rear reinforcement portion 120.

Therefore, with the present embodiment, the first front reinforcement portion 100 can reinforce a portion of the first side portion 68 on the front side in the vehicle front-rear direction, and can support the front side door 134 which has been moved to the front side in the vehicle front-rear direction. In addition, the first rear reinforcement portion 120 can reinforce a portion of the first side portion 68 on the rear side in the vehicle front-rear direction, and can support the rear side door 136 which has been moved to the rear side in the vehicle front-rear direction. Thus, with the present embodiment, the configuration of the vehicle body 12 can be simplified by achieving commonality between the reinforcement members of the vehicle body 12 and the support members for the side doors.

In addition, in the present embodiment, as illustrated in FIG. 1, the side reinforcement portion 178 which extends in the vehicle front-rear direction is provided at the second side portion 92 of the vehicle body 12. A part of a front portion of the side reinforcement portion 178 is coupled to the second front pillar portion 48, either directly or via a member. A part of a rear portion of the side reinforcement portion 178 is coupled to the second rear pillar portion 52, either directly or via a member. The rear portion of the side reinforcement portion 178 is located rearward of the front portion of the side reinforcement portion 178 in the vehicle front-rear direction.

In addition, the second front reinforcement portion 102 which extends in the vehicle front-rear direction is disposed at the second side portion 92 on the front side, in the vehicle front-rear direction, of the second front pillar portion 48. The second front reinforcement portion 102 is connected to the second front pillar portion 48 on the rear side in the vehicle front-rear direction, and connected to the front skeleton portion 98 of the vehicle body 12 on the front side in the vehicle front-rear direction.

On the other hand, the second rear reinforcement portion 122 which extends in the vehicle front-rear direction is disposed at the second side portion 92 on the rear side, in the vehicle front-rear direction, of the second rear pillar portion 52. The second rear reinforcement portion 122 is connected to the second rear pillar portion 52 on the front side in the vehicle front-rear direction, and connected to the rear skeleton portion 118 of the vehicle body 12 on the rear side in the vehicle front-rear direction.

Therefore, in the closed state, the all-around annular structure portion 180 is constructed in the vehicle 10, the all-around annular structure portion 180 including the side door reinforcement portion 176, the first front reinforcement portion 100, the first rear reinforcement portion 120, the front skeleton portion 98, the rear skeleton portion 118, the side reinforcement portion 178, the second front reinforcement portion 102, and the second rear reinforcement portion 122 and being formed annularly as seen in the vehicle up-down direction.

With the present embodiment, as a result, a load in the vehicle width direction input to the vicinity of the door opening portion 70 of the vehicle body 12 can be distributed over a wide range of the vehicle body 12 via the all-around annular structure portion 180, and deformation of the vehicle body 12 due to the load can be suppressed. Thus, with the present embodiment, it is possible to enhance the rigidity of the vehicle body 12 against a load in the vehicle width direction input to the vehicle 10.

In the present embodiment, in addition, the first front window opening portion 110 is provided on the upper side, in the vehicle up-down direction, of the first front reinforcement portion 100, and the first rear window opening portion 128 is provided on the upper side, in the vehicle up-down direction, of the first rear reinforcement portion 120, at the first side portion 68 of the vehicle body 12. Therefore, the lower edge portion of the first front window opening portion 110 can be reinforced by the first front reinforcement portion 100, and the lower edge portion of the first rear window opening portion 128 can be reinforced by the first rear reinforcement portion 120. Thus, with the present embodiment, it is possible to secure the rigidity around the window portions of the vehicle body 12 against a load in the vehicle width direction input to the vehicle 10.

In the present embodiment, additionally, as illustrated in FIGS. 9 and 10, the frame 14 which includes the pair of side frame portions 16 and the plurality of mount portions 26 which are provided on the side frame portions 16 is disposed on the lower side of the vehicle body 12. The side frame portions 16 are disposed away from each other in the vehicle width direction, and extend in the vehicle front-rear direction. The battery pack 34 is disposed between the side frame portions 16. Therefore, with the present embodiment, power can be supplied to the various devices of the vehicle 10 while securing a space in the vehicle body 12.

In addition, the battery pack 34 is covered by the cover panel 38, which extends between the side frame portions 16, from the lower side in the vehicle up-down direction, and the battery pack 34 can be protected by the cover panel 38 against input from the side of the road surface.

On the other hand, the mount portions 26 are disposed in line in the vehicle width direction, the mount portions 26 on the front side in the vehicle front-rear direction support the front lower cross portion 76 from the lower side in the vehicle up-down direction, and the mount portions 26 on the rear side in the vehicle front-rear direction support the rear lower cross portion 78 from the lower side in the vehicle up-down direction. Therefore, a rahmen structure including the front lower cross portion 76, the rear lower cross portion 78, the mount portions 26, the side frame portion 16, and the cover panel 38 is constituted. As a result, the lower portion of the vehicle 10 can be made unlikely to be deformed upon a load in the vehicle width direction input to the vehicle 10. Thus, with the present embodiment, it is possible to stably supply power to in-vehicle devices while securing a space in the cabin 40, and secure the rigidity of the lower portion of the vehicle 10 against a load in the vehicle width direction input to the vehicle 10.

Supplementary Description of Above Embodiment

In the embodiment discussed above, the slide door device 132 is provided at the first side portion 68 of the vehicle 10. However, the slide door device 132 may be provided at the second side portion 92, or the slide door device 132 may be provided at the first side portion 68 and the second side portion 92, depending on the specifications etc. of the vehicle 10. In addition, the number and the shape of window opening portions provided in the vehicle body 12 are also changeable, as appropriate, in accordance with the specifications etc. of the vehicle 10.

In the embodiment discussed above, in addition, the front side door 134 and the rear side door 136 are configured to be slidable in the vehicle front-rear direction. However, the present disclosure is not limited thereto. For example, the front side door 134 and the rear side door 136 may be formed as glide slide doors by providing a link device for each of the front side door 134 and the rear side door 136, depending on the specifications etc. of the vehicle 10. In the case where the vehicle skeleton structure according to the present embodiment is applied to small vehicles, in addition, the front side door 134 and the rear side door 136 may be replaced with a single side door, or may be formed as hinged doors.

In the embodiment discussed above, in addition, the side door reinforcement portion 176 is coupled to the first front pillar portion 46 and the first rear pillar portion 50 via a member. However, the side door reinforcement portion 176 may be directly coupled to the first front pillar portion 46 and the first rear pillar portion 50 by a lock device in the closed state, depending on the configuration etc. of the vehicle body 12.

In the embodiment discussed above, in addition, the front RF 156 is provided in the front side door 134, and the rear RF 170 is provided in the rear side door 136. However, the present disclosure is not limited thereto. For example, the side door reinforcement portion 176 may be configured to be collapsible by coupling the front RF 156 and the rear RF 170 to each other using a hinge etc., and the side door reinforcement portion 176 may be provided in the front side door 134 or the rear side door 136, depending on the specifications etc. of the vehicle 10.

In the embodiment discussed above, in addition, the roof panel 54 is reinforced by the front upper cross portion 58 and the rear upper cross portion 60. However, the present disclosure is not limited thereto. For example, the front upper cross portion 58 and the rear upper cross portion 60 may be constituted of a plate material that is made of a carbon fiber reinforced resin and that extends straight in the vehicle width direction, and may be configured not to be joined to the roof panel 54, depending on the specifications etc. of the vehicle 10.

In the embodiment discussed above, in addition, the floor panel 72 is reinforced by the front lower cross portion 76 and the rear lower cross portion 78. However, the present disclosure is not limited thereto. For example, the front lower cross portion 76 and the rear lower cross portion 78 may be constituted of a plate material that is made of a carbon fiber reinforced resin and that extends straight in the vehicle width direction, and may be configured not to be joined to the floor panel 72, depending on the specifications etc. of the vehicle 10.

In the embodiment discussed above, additionally, the vehicle 10 has a frame structure. However, the present disclosure is not limited thereto. For example, in the case where a reduction in the size of the vehicle 10 is attempted, in-wheel motors may be used, and the vehicle 10 may have a monocoque structure. With such a configuration, it is not necessary to provide the vehicle body 12 with a tunnel portion through which an exhaust pipe etc. pass, and it is possible to secure the rigidity of the vehicle body 12 using the front annular structure portion 94 and the rear annular structure portion 114 without providing a part of the tunnel portion in the front annular structure portion 94 and the rear annular structure portion 114.

What is claimed is:

1. A vehicle skeleton structure comprising:
    a first front pillar portion provided at a first side portion, on a first side in a vehicle width direction, of a vehicle body, the first front pillar portion being disposed along a peripheral edge portion, on a front side in a vehicle front-rear direction, of a door opening portion to be opened and closed by a side door device, the first front pillar portion extending in a vehicle up-down direction;
    a front window opening portion on the front side of the door opening in the vehicle front-rear direction;
    a second front pillar portion that is provided at a second side portion, on a second side in the vehicle width direction, of the vehicle body and that extends in the vehicle up-down direction;
    a front upper cross portion that extends in the vehicle width direction and that is coupled to an upper portion of the first front pillar portion and an upper portion of the second front pillar portion, either directly or indirectly;
    a front lower cross portion that extends in the vehicle width direction and that is coupled to a lower portion of the first front pillar portion and a lower portion of the second front pillar portion, either directly or indirectly;
    a first rear pillar portion provided at the first side portion and disposed along a peripheral edge portion, on a rear side in the vehicle front-rear direction, of the door opening portion, the first rear pillar portion extending in the vehicle up-down direction;
    a second rear pillar portion that is provided at the second side portion and that extends in the vehicle up-down direction;
    a rear upper cross portion that extends in the vehicle width direction and that is coupled to an upper portion of the first rear pillar portion and an upper portion of the second rear pillar portion, either directly or indirectly;

a rear lower cross portion that extends in the vehicle width direction and that is coupled to a lower portion of the first rear pillar portion and a lower portion of the second rear pillar portion, either directly or indirectly; and a side door reinforcement portion that is disposed in the side door device and that extends in the vehicle front-rear direction, a part of a front portion of the side door reinforcement portion being coupled to the first front pillar portion, either directly or indirectly, and a part of a rear portion of the side door reinforcement portion being coupled to the first rear pillar portion, either directly or indirectly, in a closed state in which the door opening portion is closed by the side door device, the rear portion of the side door reinforcement portion being located rearward of the front portion of the side door reinforcement portion in the vehicle front-rear direction, and an upper edge of the side door reinforcement portion is aligned with a lower edge of the front window opening portion in the vehicle up-down direction.

2. The vehicle skeleton structure according to claim 1, wherein the front upper cross portion and the rear upper cross portion each constitute a closed sectional structure together with a roof panel that constitutes a portion of the vehicle body on an upper side in the vehicle up-down direction.

3. The vehicle skeleton structure according to claim 1, wherein the front lower cross portion and the rear lower cross portion each constitute a closed sectional structure together with a floor panel that constitutes a portion of the vehicle body on a lower side in the vehicle up-down direction.

4. The vehicle skeleton structure according to claim 1, wherein a front side door as the side door device is disposed on a side of the first front pillar portion and a rear side door as the side door device is disposed on a side of the first rear pillar portion, at the first side portion.

5. The vehicle skeleton structure according to claim 1, further comprising:

a first front reinforcement portion that extends in the vehicle front-rear direction at the first side portion on a front side of the first front pillar portion in the vehicle front-rear direction, the first front reinforcement portion being connected to the first front pillar portion on a rear side in the vehicle front-rear direction and connected to a front skeleton portion of a front portion of the vehicle body on a front side in the vehicle front-rear direction, and at least a part of the first front reinforcement portion being disposed between a first line that extends in the vehicle front-rear direction and that passes through an upper edge portion of the side door reinforcement portion and a second line that extends in the vehicle front-rear direction and that passes through a lower edge portion of the side door reinforcement portion, as seen in the vehicle width direction; and a first rear reinforcement portion that extends in the vehicle front-rear direction at the first side portion on a rear side of the first rear pillar portion in the vehicle front-rear direction, the first rear reinforcement portion being connected to the first rear pillar portion on a front side in the vehicle front-rear direction and connected to a rear skeleton portion of a rear portion of the vehicle body on a rear side in the vehicle front-rear direction, and at least a part of the first rear reinforcement portion being disposed between the first line and the second line as seen in the vehicle width direction.

6. The vehicle skeleton structure according to claim 4, further comprising:

a first front reinforcement portion that extends in the vehicle front-rear direction at the first side portion on a front side of the first front pillar portion in the vehicle front-rear direction, the first front reinforcement portion being connected to the first front pillar portion on a rear side in the vehicle front-rear direction and connected to a front skeleton portion of a front portion of the vehicle body on a front side in the vehicle front-rear direction, and at least a part of the first front reinforcement portion being disposed between a first line that extends in the vehicle front-rear direction and that passes through an upper edge portion of the side door reinforcement portion and a second line that extends in the vehicle front-rear direction and that passes through a lower edge portion of the side door reinforcement portion, as seen in the vehicle width direction; and a first rear reinforcement portion that extends in the vehicle front-rear direction at the first side portion on a rear side of the first rear pillar portion in the vehicle front-rear direction, the first rear reinforcement portion being connected to the first rear pillar portion on a front side in the vehicle front-rear direction and connected to a rear skeleton portion of a rear portion of the vehicle body on a rear side in the vehicle front-rear direction, and at least a part of the first rear reinforcement portion being disposed between the first line and the second line as seen in the vehicle width direction.

7. The vehicle skeleton structure according to claim 6, wherein:

the front side door is provided with a front door reinforcement portion that constitutes a portion on a front side of the side door reinforcement portion in the vehicle front-rear direction;

the rear side door is provided with a rear door reinforcement portion that constitutes a portion on a rear side of the side door reinforcement portion in the vehicle front-rear direction; and a rear end portion of the front side door and a front end portion of the rear side door are coupled to each other via a lock device in a state of overlapping each other as seen in the vehicle width direction in the closed state.

8. The vehicle skeleton structure according to claim 6, wherein the front side door and the rear side door are slidable in the vehicle front-rear direction, the first front reinforcement portion is provided with a front rail portion that guides the front side door, and the first rear reinforcement portion is provided with a rear rail portion that guides the rear side door.

9. The vehicle skeleton structure according to claim 5, further comprising:

a side reinforcement portion that is provided at the second side portion and that extends in the vehicle front-rear direction, a part of a front portion of the side reinforcement portion being coupled to the second front pillar portion, either directly or indirectly, and a part of a rear portion of the side reinforcement portion being coupled to the second rear pillar portion, either directly or indirectly, and the rear portion of the side reinforcement portion being located rearward of the front portion of the side reinforcement portion in the vehicle front-rear direction;

a second front reinforcement portion that extends in the vehicle front-rear direction at the second side portion on a front side of the second front pillar portion in the vehicle front-rear direction, the second front reinforcement portion being connected to the second front pillar portion on a rear side in the vehicle front-rear direction and connected to the front skeleton portion on a front side in the vehicle front-rear direction; and a second rear reinforcement portion that extends in the vehicle front-rear direction at the second side portion on a rear side of the second rear pillar portion in the vehicle front-rear direction, the second rear reinforcement portion being connected to the second rear pillar portion on a front side in the vehicle front-rear direction and connected to the rear skeleton portion on a rear side in the vehicle front-rear direction.

10. The vehicle skeleton structure according to claim 5, wherein a window opening portion is provided on an upper side, in the vehicle up-down direction, of at least one of the first front reinforcement portion and the first rear reinforcement portion.

11. The vehicle skeleton structure according to claim 1, further comprising:

a frame that includes a pair of side frame portions and a plurality of mount portions, the side frame portions being disposed on a lower side, in the vehicle up-down direction, of the vehicle body and disposed away from each other in the vehicle width direction, and the side frame portions extending in the vehicle front-rear direction, and the mount portions being provided on the side frame portions and disposed in line in the vehicle width direction, and the mount portions supporting the front lower cross portion or the rear lower cross portion from the lower side in the vehicle up-down direction; and a cover panel portion that covers, from the lower side in the vehicle up-down direction, a power supply portion disposed between the side frame portions and that extends between the side frame portions.

12. The vehicle skeleton structure according to claim 1, wherein:

the first front pillar portion, the second front pillar portion, the front upper cross portion, and the front lower cross portion constitute a front annular structure portion configured annularly as seen in the vehicle front-rear direction; and the first rear pillar portion, the second rear pillar portion, the rear upper cross portion, and the rear lower cross portion constitute a rear annular structure portion configured annularly as seen in the vehicle front-rear direction.

13. The vehicle skeleton structure according to claim 1, wherein:

the upper portion of the first front pillar portion and the lower portion of the first front pillar portion overlap each other as seen in the vehicle up-down direction;

the upper portion of the second front pillar portion and the lower portion of the second front pillar portion overlap each other as seen in the vehicle up-down direction;

the upper portion of the first rear pillar portion and the lower portion of the first rear pillar portion overlap each other as seen in the vehicle up-down direction; and the upper portion of the second rear pillar portion and the lower portion of the second rear pillar portion overlap each other as seen in the vehicle up-down direction.

* * * * *